(12) United States Patent
Chen et al.

(10) Patent No.: US 12,408,426 B2
(45) Date of Patent: Sep. 2, 2025

(54) CIRCUITS DESIGNED AND MANUFACTURED WITH FIRST AND SECOND DESIGN RULES

(71) Applicant: Taiwan Semiconductor Manufacturing Company, Ltd., Hsinchu (TW)

(72) Inventors: Chung-Hui Chen, Hsinchu (TW); Tzu-Ching Chang, Dali (TW); Weichih Chen, Hsinchu (TW); Wan-Te Chen, Danshui Township (TW); Tsung-Hsin Yu, Hsinchu (TW); Cheng-Hsiang Hsieh, Taipei (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 724 days.

(21) Appl. No.: 17/542,014

(22) Filed: Dec. 3, 2021

(65) Prior Publication Data

US 2022/0278099 A1    Sep. 1, 2022

Related U.S. Application Data

(60) Provisional application No. 63/163,982, filed on Mar. 22, 2021, provisional application No. 63/154,294, filed on Feb. 26, 2021.

(51) Int. Cl.
| | | |
|---|---|---|
| *G06F 30/30* | (2020.01) | |
| *G06F 30/327* | (2020.01) | |
| *G06F 30/36* | (2020.01) | |
| *G06F 30/392* | (2020.01) | |
| *H10D 84/85* | (2025.01) | |
| *G06F 115/06* | (2020.01) | |
| *G06F 117/12* | (2020.01) | |

(52) U.S. Cl.
CPC ......... *H10D 84/853* (2025.01); *G06F 30/327* (2020.01); *G06F 30/36* (2020.01); *G06F 30/392* (2020.01); *G06F 2115/06* (2020.01); *G06F 2117/12* (2020.01)

(58) Field of Classification Search
CPC ............. H01L 27/0924; H01L 27/0207; H01L 27/11807; H01L 2027/11883; G06F 30/327; G06F 30/36; G06F 30/392; G06F 2115/06; G06F 2117/12; G06F 30/398
See application file for complete search history.

(56) References Cited

U.S. PATENT DOCUMENTS

2011/0175154 A1* 7/2011 Shrivatsava ........ H01L 29/7881
257/316
2012/0280331 A1* 11/2012 Ou .......................... G06F 30/39
438/584

(Continued)

*Primary Examiner* — Jack Chiang
*Assistant Examiner* — Brandon Bowers
(74) *Attorney, Agent, or Firm* — Merchant & Gould P.C.

(57) ABSTRACT

An integrated circuit (IC) including a plurality of finfet cells designed with digital circuit design rules to provide smaller finfet cells with decreased cell heights, and analog circuit cell structures including first finfet cells of the plurality of finfet cells and including at least one cut metal layer. The smaller finfet cells with decreased cell heights provide a first shorter metal track in one direction and the at least one cut metal layer provides a second shorter metal track in another direction to increase maximum electromigration currents in the integrated circuit.

20 Claims, 19 Drawing Sheets

(56) References Cited

U.S. PATENT DOCUMENTS

| | | | |
|---|---|---|---|
| 2014/0245248 A1* | 8/2014 | Yang | G06F 30/392 |
| | | | 716/122 |
| 2017/0148779 A1 | 5/2017 | Becker | |
| 2019/0211475 A1* | 7/2019 | Ito | G06F 30/398 |
| 2020/0006484 A1* | 1/2020 | Lin | H01L 21/76224 |
| 2020/0381548 A1* | 12/2020 | Lu | H01L 29/6656 |
| 2021/0111246 A1* | 4/2021 | Lie | H01L 21/823871 |

\* cited by examiner

| Threshold Voltage | Usage | Vt | Analog with Analog Rules (518) | Analog with Digital Rules (514) | Digital with Digital Rules (516) |
|---|---|---|---|---|---|
| SVT (502) | Standard Vt Lowest Leakage | Highest | V | V | V |
| LVTLL (504) | Low Vt Low Leakage | <SVT | V | V | V |
| LVT (506) | Low Vt | <LVTLL | V | V | V |
| ULVTLL (508) | Ultra low Vt, low leakage | <LVT | X | V | V |
| ULVT (510) | Ultra low Vt | <ULVTLL | V | V | V |
| ELVT (512) | Extreme low Vt | Lowest | X | V | V |

Fig. 13

CIRCUITS DESIGNED AND MANUFACTURED WITH FIRST AND SECOND DESIGN RULES

CROSS-REFERENCE TO RELATED APPLICATIONS

This application claims the benefit of U.S. Provisional Patent Application No. 63/154,294, filed on Feb. 26, 2021, and U.S. Provisional Patent Application No. 63/163,982, filed on Mar. 22, 2021, the disclosures of which are incorporated by reference in their entirety.

BACKGROUND

Electronic circuits continue to be designed and manufactured to operate at higher and higher operating speeds. Circuits such as serializer/deserializer (serdes) circuits currently operate in a frequency range from 28 gigabits-per-second (Gbps) to 448 Gbps. Key device parameters for operating at these speeds include trans-conductance (GM), unit gain frequency (UGF), and electromigration (EM) considerations. In the past, these circuits have been designed using analog circuit design rules including an analog fin formation or boundary. To achieve the higher operating speeds, all three of these key device parameters have been increased by using larger contact poly pitch (CPP), wider metal over diffusion [source/drain contacts] (MD), larger vias, wider metal lines, and larger spaces. Changing these structures can reduce both resistance and capacitance and improve the GM, UGF, and maximum EM current.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

FIG. 13 is a table illustrating threshold voltage (Vt) levels that can be achieved in analog and digital cells designed using digital circuit design rules and the digital fin boundary versus Vt levels that can be achieved in analog cells designed using analog circuit design rules and the analog fin boundary, in accordance with some embodiments.

DETAILED DESCRIPTION

Figure 1:
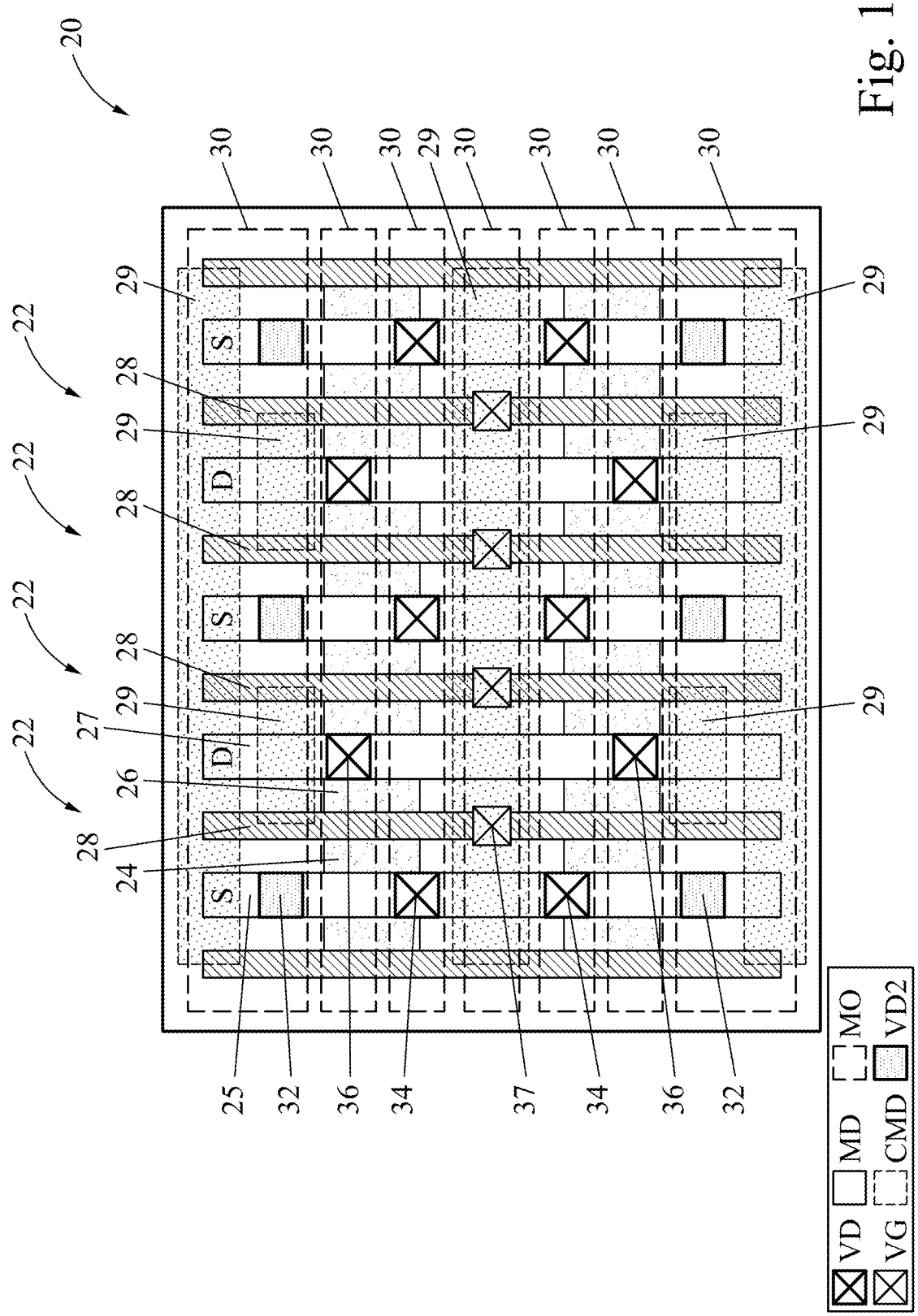
FIG. 1 is a top-view diagram schematically illustrating an example of first layer metal (M0) and below in a portion of an integrated circuit (IC) that includes part of a serial/deserializing (serdes) circuit designed using digital circuit (logic) design rules and the digital fin boundary, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the past, some semiconductor structures, including some integrated circuits, have been designed and manufactured using only analog circuit design rules and an analog fin boundary. These integrated circuits can include one or more analog circuits, one or more digital circuits, a mixture of analog and digital circuits, and/or one or more serdes circuits. However, as manufacturing processes are scaled down, performance improvements using the analog fin boundary are limited by device size.

To meet the challenges of increased operating speeds and smaller device sizes, the semiconductor structures of the present disclosure include circuits, such as analog circuits, digital circuits, a mixture of analog and digital circuits, and/or serdes circuits that are designed and manufactured using a combination of a first set of design rules with a first fin boundary and a second set of design rules with a second fin boundary. Where, the first set of design rules are different than the second set of design rules and the first fin boundary is different than the second fin boundary.

In embodiments, the first set of design rules are analog circuit design rules with an analog fin boundary and the second set of design rules are digital circuit design rules (logic design rules), such as standard cell logic design rules, with a digital fin boundary. The performance of circuits designed and manufactured using the digital circuit design rules improves as process geometries are scaled down or reduced. In some embodiments, the semiconductor structures that are the subject matter of the present disclosure include analog circuits, digital circuits, mixed analog and digital circuits, and/or serdes circuits designed and manufactured using a combination of the analog circuit design rules with the analog fin boundary and the digital circuit design rules with the digital fin boundary.

In some embodiments, the analog circuit design rules include one or more of aligning fins of finfets on fin grid lines of the analog fin boundary, providing one via over drain/source contact (VD) in one size range, aligning M0 with the fins and having one standard M0 width, providing a limited number of threshold voltages, not cutting metal layers, and having analog circuit cells that cannot directly abut digital circuit cells. In contrast, in some embodiments, the digital circuit design rules include one or more of not aligning fins of finfets on fin grid lines of the analog fin boundary, providing multiple different via over drain/source contacts including VD and a larger via over drain/source contact (VD2) that has a smaller resistance than VD, providing multiple widths of M0 and not aligning M0 with fins, providing additional threshold voltages including ultra low threshold voltages with low leakage (ULVTLL) and extreme low threshold voltages (ELVT), cutting metal lines and having shorter cell heights which provide shorter metal track lengths, and providing analog circuit cells that can directly abut digital circuit cells.

In some embodiments, each of the first and second sets of design rules includes spacing requirements between each of the vias in the layout design. In some embodiments, each of the first and second sets of design rules includes pitch spacing requirements between via layout patterns. In some embodiments, each of the first and second sets of design rules includes pitch spacing requirements between fin layout patterns of layout designs. In some embodiments, each of the first and second sets of design rules includes spacing requirements between via layout patterns and cut feature layout patterns. In some embodiments, each of the first and second sets of design rules includes spacing requirements between active region layout patterns and cut feature layout patterns. In some embodiments, each of the first and second sets of design rules includes spacing requirements between active region layout patterns. In some embodiments, each of the first and second sets of design rules includes one or more MD design rules. In some embodiments, each of the first and second sets of design rules includes one or more via over gate [gate contact] (VG) design rules. In some embodiments, each of the first and second sets of design rules includes one or more metal zero (M0) track design rules.

Throughout this disclosure, finfet cells and circuits that were previously designed and manufactured using the analog circuit design rules and the analog fin boundary are designed and manufactured using the digital circuit design rules and the digital fin boundary. These finfet cells and circuits are referred to herein as analog cells designed using the digital circuit design rules and the digital fin boundary. In embodiments, these analog cells can be used in analog circuits, digital circuits, a mixture of analog and digital circuits, and in serdes circuits.

In embodiments, the digital fin boundary is applied to finfet cells in circuits, such as analog circuits, mixed analog and digital circuits, and/or serdes circuits, such that the fins of these finfet cells are not situated on grid lines of a fin grid structure associated with the analog circuit design rules and the analog fin boundary. Instead, the fins are situated between or interleaved with the grid lines of the fin grid structure. With the fins situated between the grid lines of the fin grid structure, the height of the finfet cells can be decreased and the size of the device can be reduced.

Also, the digital fin boundary of the fins in these finfet cells is the same as the digital fin boundary of fins in logic finfet cells, such that these circuits can be placed directly adjacent the logic finfet cells, without including a keep-out zone or region between the circuits and the digital logic finfet cells. This saves space and reduces the size of the device. In addition, the digital fin boundary leaves a space between fins in the middle of the finfet cell, which can be used for routing. In some embodiments, using the space between fins for routing increases space usage and reduces the size of the device.

In some embodiments, the circuit types designed with the digital fin boundary instead of an analog fin boundary include NMOS finfets arranged in rows and PMOS finfets arranged in rows. In some embodiments, the arrangement of NMOS finfets and PMOS finfets in at least one of these circuits is the same as the arrangement of NMOS finfets and PMOS finfets in at least one logic circuit designed with the digital fin boundary. In some embodiments, the arrangement of the NMOS finfets and the PMOS finfets in at least one of these circuits is different than the arrangement of the NMOS finfets and the PMOS finfets in at least one logic circuit designed with the digital fin boundary.

Analog cells and circuits designed and manufactured using the digital circuit design rules and the digital fin boundary can include MEOL layers that are not included in circuits designed using the analog circuit design rules and the analog fin boundary. For example, the cells designed and manufactured using the digital circuit design rules can include the larger via over drain/source contact VD2 to the MD to improve performance, since the resistance of VD2 is at least 50% lower than the resistance of the smaller via over drain/source contact VD to the MD.

In addition, the arrangement of M0 lines in the finfet cells designed using the digital circuit design rules can be different than the arrangement of M0 lines in a finfet cell designed using the analog circuit design rules. For example, the number of M0 lines or tracks in the finfet cell designed using the digital circuit design rules is optional and may vary from 1 to 5 lines or more.

Also, the circuits designed using the digital circuit design rules can include shorter MD such that the maximum EM current is higher, shorter M0 lines such that the maximum EM current is higher, and shorter second layer metal (M1) lines such that the maximum EM current is higher.

The advantages of designing and manufacturing integrated circuits that include cells and circuits designed with the digital fin boundary instead of the analog fin boundary include circuits with higher GM, higher UGF, and higher EM. The GM is higher since resistance is lower in the MEOL and back end of line (BEOL) using the digital circuit design rules. Also, UGF=GM/C, so the UGF is higher with the higher GM and a smaller MEOL capacitance C. In addition, the maximum EM current is higher with shorter metal lines, where the digital circuit design rules allow M0 to be cut, and a shorter cell height results in shorter M1 lines.

FIG. 1 is a top-view diagram schematically illustrating an example of M0 lines and below in a portion of an IC 20 that includes part of a serdes circuit designed using digital circuit design rules, in accordance with some embodiments. The IC 20 includes multiple finfets 22 situated from left to right in FIG. 1. Each of the finfets 22 includes fin source regions 24 electrically coupled to one or more MD 25 indicated at S, fin drain regions 26 electrically coupled to one or more MD 27 indicated at D, and a gate 28 situated between the corresponding source and drain regions 24 and 26. In this example, each of the finfets 22 may have the MD 25 and 27 cut to provide cut MD regions (CMD) 29.

In embodiments, in each of the finfets 22 the MD 25 of the source S is connected to M0 30 through one or more VD2 32 and through one or more VD 34. Also, in each of the finfets 22 the MD 27 of the drain D is connected to M0 30 through one or more VD 36. Each of the gates 28 is connected to M0 30 through a via over gate contact (VG) 37.

Figure 2:
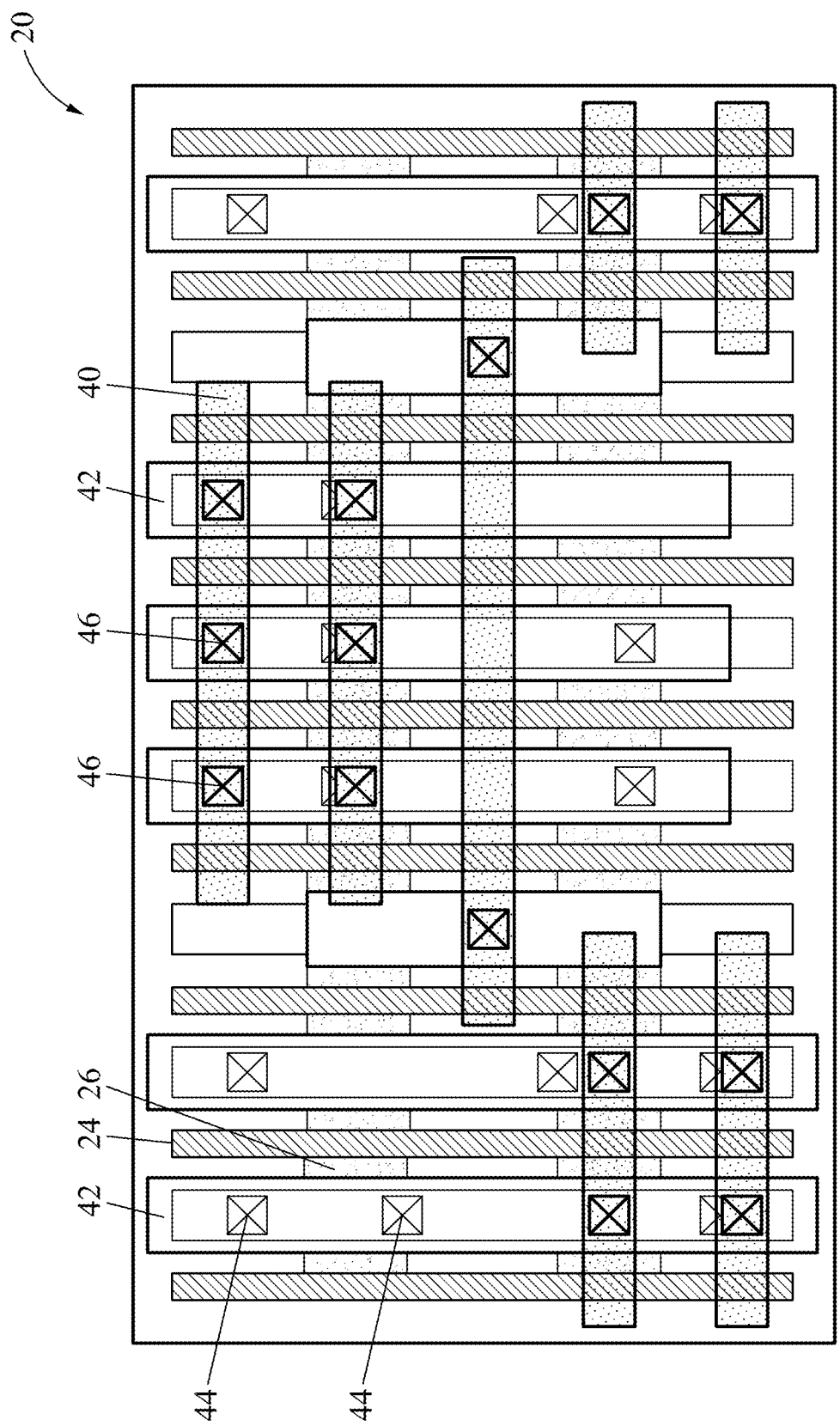
FIG. 2 is a top-view diagram schematically illustrating an example of back end of line (BEOL) layers up to third layer metal (M2) of the IC including the serdes circuit designed using digital circuit design rules and the digital fin boundary, in accordance with some embodiments.

FIG. 2 is a top-view diagram schematically illustrating an example of BEOL layers up to M2 40 in the IC 20, in accordance with some embodiments. The IC 20 includes M2 40 disposed in horizontal lines or tracks on the IC 20 and M1 42 disposed in vertical lines or tracks on the IC 20.

As shown in FIGS. 1 and 2, M0 30 is disposed in horizontal lines or tracks on the IC 20, such that the vertical lines of M1 42 are orthogonal to the horizontal lines of M0 30 and orthogonal to the horizontal lines of M2 40. The tracks of M1 42 are connected to various tracks of M0 30 through first vias 44 (VIA0), and the tracks of M1 42 are further connected to the tracks of M2 40 through second vias 46 (VIA1). Thus, the BEOL layers up to M2 40 are electrically coupled to the source/drain regions 24 and 26 of the IC 20 and, in embodiments, to the gates 28 of the IC 20.

The finfets 22 of the IC 20 are connected to one another by the different metal layers of M0 30, M1 42, and M2 40 to perform the functions of the IC 20. In the current example embodiments, the IC 20 includes part of a serdes circuit designed using the digital circuit design rules and the digital fin boundary, instead of being designed using the analog circuit design rules and the analog fin boundary. In other example embodiments, the IC 20 can include other circuits, such as analog circuits, digital circuits, and/or mixed analog and digital circuits designed using the digital circuit design rules and the digital fin boundary.

Figure 3:
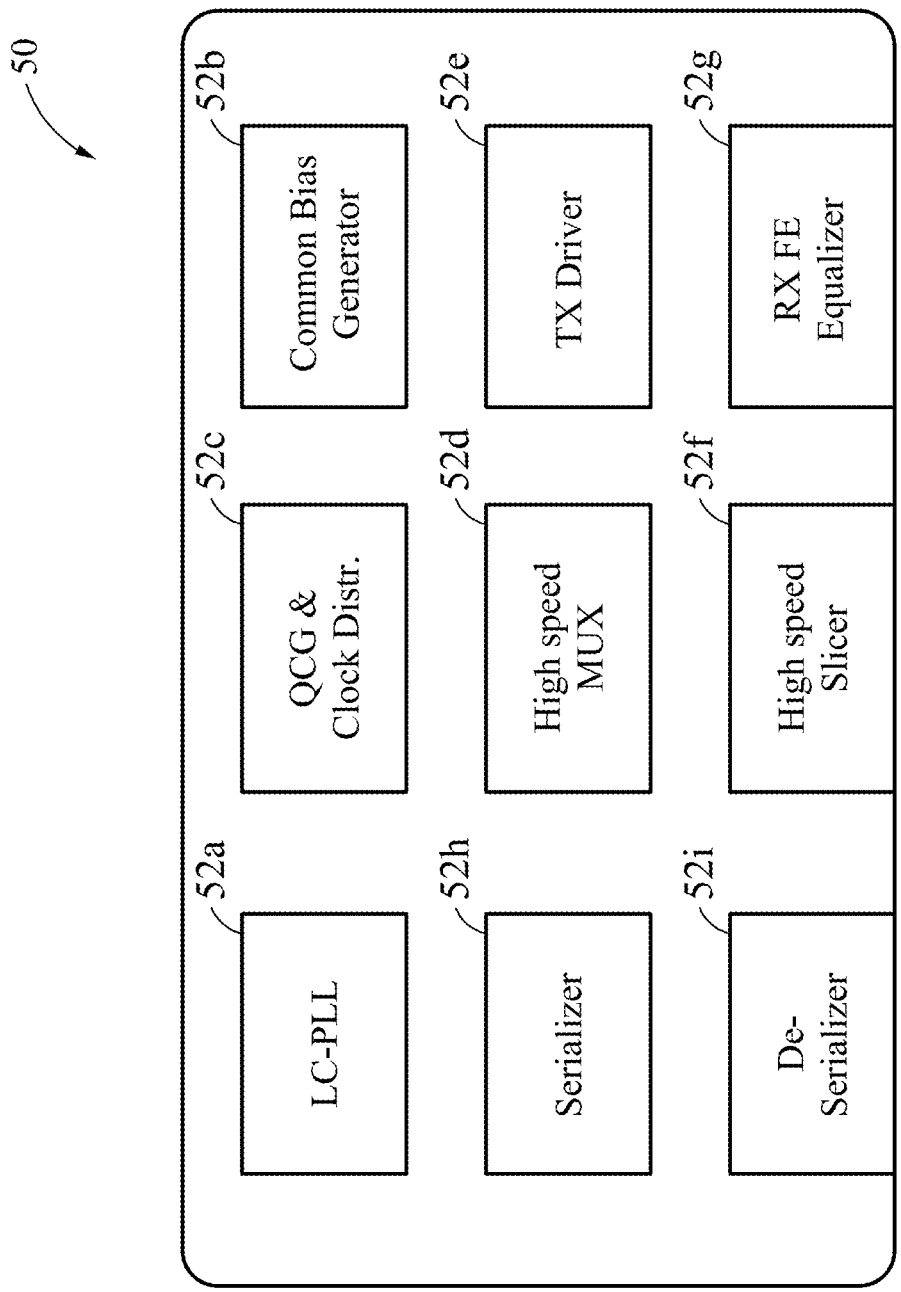
FIG. 3 is a block diagram schematically illustrating an example of a serdes circuit that is designed and manufactured using both analog circuit design rules with an analog fin boundary and digital circuit design rules with a digital fin boundary, in accordance with some embodiments.

FIG. 3 is a block diagram schematically illustrating an example of a serdes circuit 50 that is designed and manufactured using both analog circuit design rules with an analog fin boundary and digital circuit design rules with a digital fin boundary, in accordance with some embodiments. The serdes circuit 50 includes multiple circuit elements or blocks 52a-52i. In embodiments, at least one of the circuit blocks 52a-52i is designed and manufactured using only analog circuit design rules and the analog fin boundary, at least one of the circuit blocks 52a-52i is designed and manufactured using only digital circuit design rules and the digital fin boundary, and at least one of the circuit blocks 52a-52i is designed and manufactured using both the analog circuit design rules and the analog fin boundary and the digital circuit design rules and the digital fin boundary.

The analog circuit design rules and the analog fin boundary can be used to provide long channel finfets. Long channel finfets have higher active area densities, where the active areas correspond to source and/or drain diffusion portions. Also, the long channel finfets have lower noise levels, and the long channel finfets may have a thicker oxide layer, such that the long channel finfets can bear higher voltages and are well suited for IO devices. In some embodiments, the active area layout patterns are referred to as oxide diffusion (OD) region layout patterns, where the OD region layout patterns are usable to manufacture source and/or drain regions of one or more transistors.

The digital circuit design rules and the digital fin boundary can be used to provide higher GM, higher UGF, and higher maximum EM currents. The digital fin boundary provides MEOL layers and BEOL layers that have lower interconnect resistance, which results in a higher GM. Also, the digital fin boundary provides a smaller cell size, such that capacitance C values are lower, where the higher GM and the lower capacitance C contribute to a higher UGF. In addition, the digital fin boundary provides shorter metal tracks, such as shorter M0 tracks and shorter M1 tracks due to a smaller cell size, which increases the maximum EM current.

In embodiments, circuit blocks 52a and 52b are designed and manufactured using only the analog circuit design rules and the analog fin boundary. The circuit blocks 52a and 52b include a long channel phase locked loop (LC-PLL) and a common bias generator, respectively. Long channel finfets made with the analog fin boundary are used in the LC-VCO to minimize noise, and long channel finfets are used in current mirrors to reduce the area used in the IC.

In embodiments, circuit blocks 52c-52g are designed and manufactured according to the digital circuit design rules and the digital fin boundary. The circuit blocks 52c-52g include a quaternary clock generator (QCG) and clock distribution elements, a high-speed multiplexer (MUX), a transmit (TX) driver, a high-speed slicer, and a receiver (RX) front end (FE) equalizer, respectively. The digital fin boundary is used on these circuits to attain the high bandwidth of the serdes circuit 50.

In embodiments, circuit blocks 52h and 52i are designed and manufactured using both the analog fin boundary and the digital fin boundary. The circuit blocks 52h and 52i include a serializer circuit and a deserializer circuit, respectively. In these circuits, from an area point of view, the analog fin boundary has better active area densities than the digital fin boundary, such that if these circuits were designed using only the digital fin boundary, they would suffer an area penalty.

Figure 4:
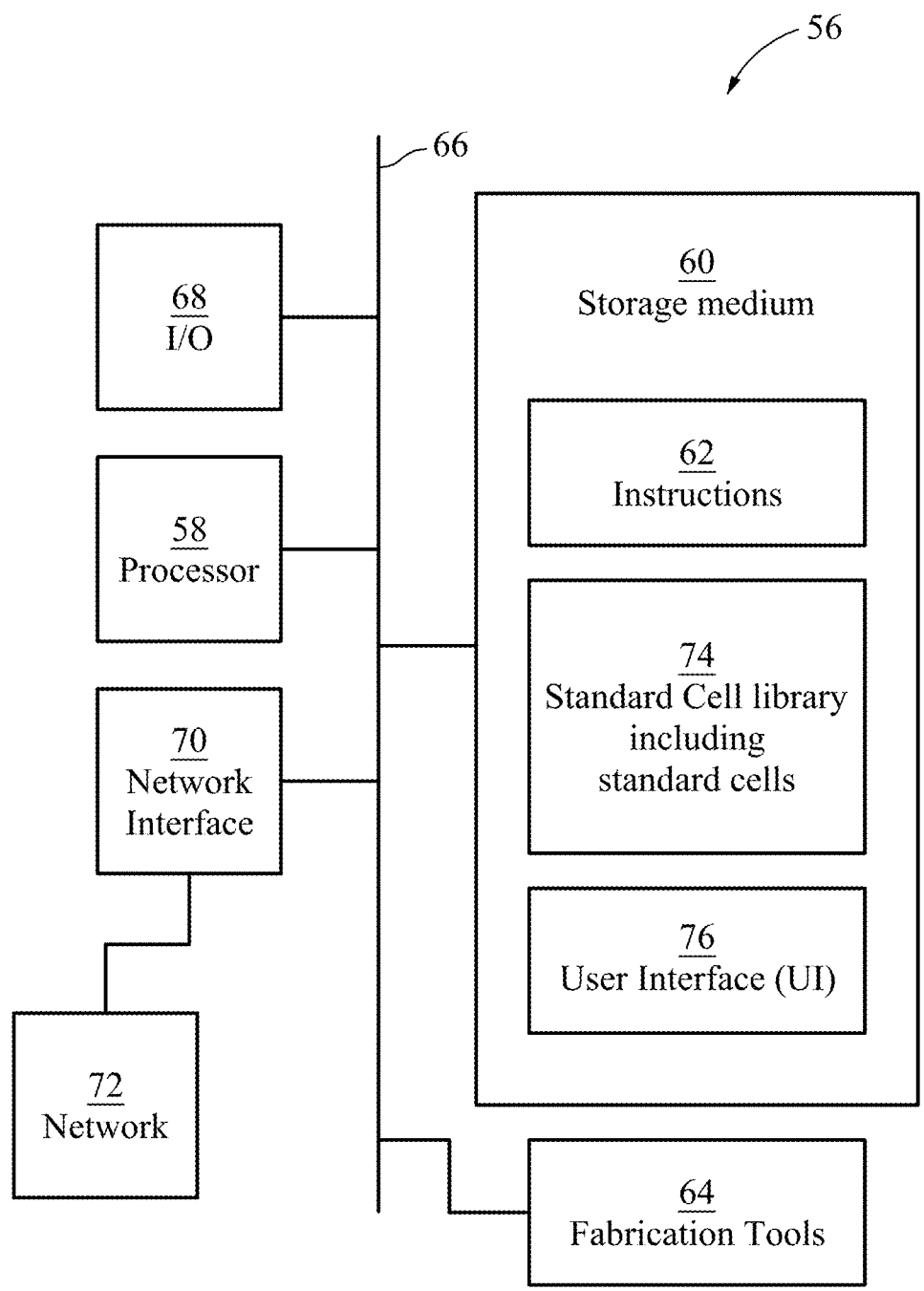
FIG. 4 is a block diagram illustrating an example of a computer system configured to design and manufacture the cells and circuits of this disclosure, in accordance with some embodiments.

The layout process may be implemented by a computer system, such as an EDA system. FIG. 4 is a block diagram illustrating various aspects of an EDA system 56, in accordance with the present disclosure. Some or all the operations for layout methods disclosed herein are capable of being performed as part of a design procedure performed in a design house, such as the design house 80 discussed below with respect to FIG. 5.

In some embodiments, the EDA system 56 shown in FIG. 4 includes an automated place and route (APR) system. In some embodiments, the EDA system 56 is a general-purpose computing device including a processor 58 and a non-transitory, computer-readable storage medium 60. The computer-readable storage medium 60 may be encoded with, e.g., store, computer program code such as a set of executable instructions 62. Execution of the instructions 62 by the processor 58 represents (at least in part) an EDA tool that implements a portion or all of the functions of the system 56, such as providing layouts using the analog and digital circuit design rules and processes described herein. Further, fabrication tools 64 are included to layout and physically implement the design and manufacture of the layouts.

The processor 58 is electrically coupled to the computer-readable storage medium 60 via a bus 66. The processor 58 is also electrically coupled to an I/O interface 68 by the bus 66. A network interface 70 is also electrically connected to the processor 58 via the bus 66. The network interface 70 is connected to a network 72, so that the processor 58 and the computer-readable storage medium 60 are capable of connecting to external elements via the network 72. The processor 58 is configured to execute the computer program code or instructions 62 encoded in the computer-readable storage medium 60 to cause the system 56 to be usable for performing a portion or all of the functions of the system 56, such as providing layouts using the analog and digital circuit design rules and processes described herein and other functions of the system 56. In embodiments, the processor 58 is a central processing unit (CPU), a multi-processor, a distributed processing system, an application specific integrated circuit (ASIC), and/or a suitable processing unit.

In embodiments, the computer-readable storage medium 60 is an electronic, magnetic, optical, electromagnetic, infrared, and/or semiconductor system or apparatus or device. For example, the computer-readable storage medium 60 can include a semiconductor or solid-state memory, a magnetic tape, a removable computer diskette, a random access memory (RAM), a read-only memory (ROM), a rigid magnetic disk, and/or an optical disk. In embodiments using optical disks, the computer-readable storage medium 60 can include a compact disk, read only memory (CD-ROM), a compact disk read/write memory (CD-R/W), and/or a digital video disc (DVD).

In some embodiments, the computer-readable storage medium 60 stores computer program code or instructions 62 configured to cause the system 56 to be usable for performing a portion or all of the functions of the system 56, such as providing layouts using the analog and digital circuit design rules and processes described herein and other functions of the system 56. In some embodiments, the computer-readable storage medium 60 also stores information which facilitates performing a portion or all of the functions of the system 56. In some embodiments, the computer-readable storage medium 60 stores a standard cell library 74 that includes standard logic cells.

The EDA system 56 includes the I/O interface 68, which is coupled to external circuitry. In embodiments, the I/O interface 68 includes a keyboard, keypad, mouse, trackball, trackpad, touchscreen, and/or cursor direction keys for communicating information and commands to the processor 58.

The network interface 70 is coupled to the processor 58 and allows the system 56 to communicate with the network 72, to which one or more other computer systems are connected. The network interface 70 can include: wireless network interfaces such as BLUETOOTH, WIFI, WIMAX, GPRS, or WCDMA; or wired network interfaces such as ETHERNET, USB, or IEEE-1364. In embodiments, a portion or all of the functions of the system 56 can be performed in two or more systems 56.

The system 56 is configured to receive information through the I/O interface 68. The information received through the I/O interface 68 includes one or more of instructions, data, design rules, libraries of standard cells, and/or other parameters for processing by processor 58. The information is transferred to the processor 58 via the bus 66. Also, the EDA system 56 is configured to receive information related to a user interface (UI) through the I/O interface 68. This information can be stored in the computer-readable medium 60 as a UI 76.

In some embodiments, a portion or all the functions of the system 56 are implemented via a standalone software application for execution by a processor. In some embodiments, a portion or all the functions of the system 56 are implemented in a software application that is a part of an additional software application. In some embodiments, a portion or all the functions of the system 56 are implemented as a plug-in to a software application. In some embodiments, at least one of the functions of the system 56 is implemented as a software application that is a portion of an EDA tool. In some embodiments, a portion or all the functions of the system 56 are implemented as a software application that is used by the EDA system 56. In some embodiments, a layout diagram which includes standard cells is generated using a tool such as VIRTUOSO available from CADENCE DESIGN SYSTEMS, Inc., or another suitable layout generating tool.

In some embodiments, the layouts and other processes are realized as functions of a program stored in a non-transitory computer readable recording medium. Examples of a non-transitory computer readable recording medium include, but are not limited to, external/removable and/or internal/built-in storage or memory units, e.g., one or more optical disks such as a DVD, a magnetic disk such as a hard disk, a semiconductor memory such as a ROM and RAM, and a memory card, and the like.

As noted above, embodiments of the EDA system 56 include fabrication tools 64 for implementing the manufacturing processes of the system 56. For example, a synthesis may be performed on a design in which the behavior and/or functions desired from the design are transformed to a functionally equivalent logic gate-level circuit description by matching the design to standard cells selected from the standard cell library 74. This synthesis results in a functionally equivalent logic gate-level circuit description, such as a gate-level netlist. Based on the gate-level netlist, a photolithographic mask may be generated that is used to fabricate the IC by the fabrication tools 64.

Figure 5:
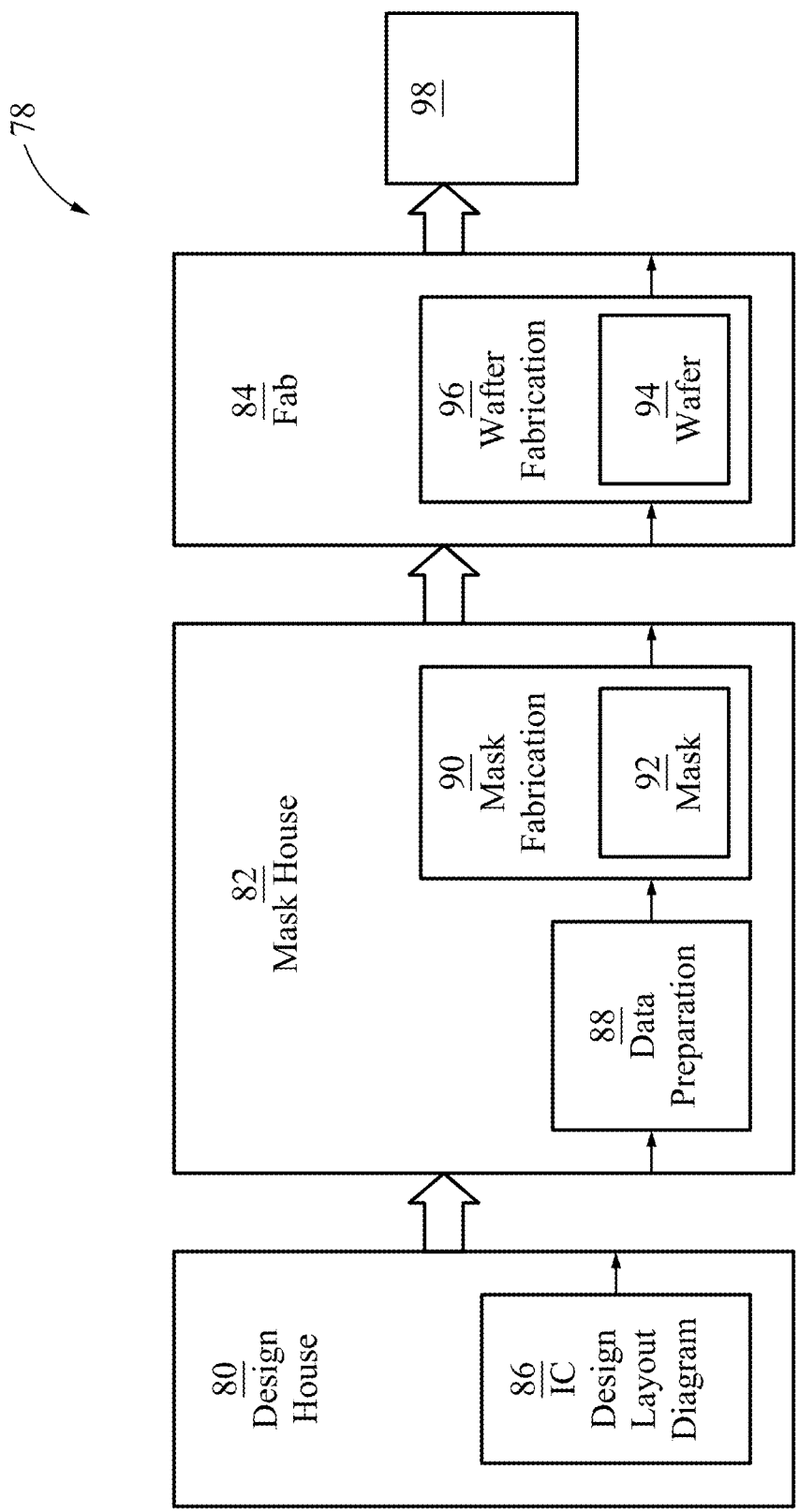
FIG. 5 is a block diagram of an IC manufacturing system and an IC manufacturing flow associated therewith, in accordance with some embodiments.

Further aspects of device fabrication are disclosed in conjunction with FIG. 5, which is a block diagram of an IC manufacturing system 78 and an IC manufacturing flow associated therewith, in accordance with some embodiments. In some embodiments, based on a layout diagram, at least one of: one or more semiconductor masks; or at least one component in a layer of a semiconductor IC is fabricated using the manufacturing system 78.

In FIG. 5, the IC manufacturing system 78 includes entities, such as a design house 80, a mask house 82, and an IC manufacturer/fabricator ("fab") 84, that interact with one another in the design, development, and manufacturing cycles and/or services related to manufacturing an IC, such as the ICs described herein. The entities in the system 78 are connected by a communications network. In some embodiments, the communications network is a single network. In some embodiments, the communications network is a variety of different networks, such as an intranet and the internet. The communications network includes wired and/or wireless communication channels. Each entity interacts with one or more of the other entities and provides services to and/or receives services from one or more of the other entities. In some embodiments, two or more of the design house 80, the mask house 82, and the IC fab 84 are owned by a single larger company. In some embodiments, two or more of the design house 80, the mask house 82, and the IC fab 84 coexist in a common facility and use common resources.

The design house (or design team) 80 generates an IC design layout diagram 86. The IC design layout diagram 86 includes various geometrical patterns, or IC layout diagrams designed for an IC device, such as the devices designed with the analog circuit design rules and the analog fin boundary and/or the digital circuit design rules and the digital fin boundary. The geometrical patterns correspond to patterns of metal, oxide, or semiconductor layers that make up the various components of the semiconductor structures to be fabricated. The various layers combine to form various IC features. For example, a portion of the IC design layout diagram 86 includes various IC features, such as active regions, gate electrodes, sources, drains, metal lines, local vias, and openings for bond pads, to be formed in a semiconductor substrate (such as a silicon wafer) and in various material layers disposed on the semiconductor substrate. The design house 80 implements a design procedure to form an IC design layout diagram 86. The design procedure includes one or more of analog circuit design, digital logic circuit design, physical layout designs, and place and route routines. The IC design layout diagram 86 is presented in one or more data files having information of the geometrical patterns. For example, IC design layout diagram 86 can be expressed in a GDSII file format or DFII file format.

The mask house 82 includes data preparation 88 and mask fabrication 90. The mask house 82 uses the IC design layout diagram 86 to manufacture one or more masks 92 to be used for fabricating the various layers of the IC or semiconductor structure. The mask house 82 performs mask data preparation 88, where the IC design layout diagram 86 is translated into a representative data file (RDF). The mask data preparation 88 provides the RDF to the mask fabrication 90. The mask fabrication 90 includes a mask writer that converts the RDF to an image on a substrate, such as a mask (reticle) 92 or a semiconductor wafer 94. The design layout diagram 86 is manipulated by the mask data preparation 88 to comply with particular characteristics of the mask writer and/or requirements of the IC fab 84. In FIG. 5, the mask data preparation 88 and the mask fabrication 90 are illustrated as separate elements. In some embodiments, the mask data preparation 88 and the mask fabrication 90 can be collectively referred to as mask data preparation.

In some embodiments, the mask data preparation 88 includes an optical proximity correction (OPC) which uses lithography enhancement techniques to compensate for image errors, such as those that can arise from diffraction, interference, other process effects and the like. The OPC adjusts the IC design layout diagram 86. In some embodiments, the mask data preparation 88 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 88 includes a mask rule checker (MRC) that checks the IC design layout diagram 86 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 86 to compensate for limitations during the mask fabrication 90, which may undo part of the modifications performed by OPC in order to meet mask creation rules.

In some embodiments, the mask data preparation 88 includes lithography process checking (LPC) that simulates processing that will be implemented by the IC fab 84. LPC simulates this processing based on the IC design layout diagram 86 to create a simulated manufactured device. The processing parameters in LPC simulation can include parameters associated with various processes of the IC manufacturing cycle, parameters associated with tools used for manufacturing the IC, and/or other aspects of the manufacturing process. LPC considers various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the IC design layout diagram 86.

The above description of mask data preparation 88 has been simplified for the purposes of clarity. In some embodiments, data preparation 88 includes additional features such as a logic operation (LOP) to modify the IC design layout diagram 86 according to manufacturing rules. Additionally, the processes applied to the IC design layout diagram 86 during data preparation 88 may be executed in a variety of different orders.

After the mask data preparation 88 and during the mask fabrication 90, a mask 92 or a group of masks 92 are fabricated based on the modified IC design layout diagram 86. In some embodiments, the mask fabrication 90 includes performing one or more lithographic exposures based on the IC design layout diagram 86. In some embodiments, an electron-beam (e-beam) or a mechanism of multiple e-beams is used to form a pattern on a mask (photomask or reticle) 92 based on the modified IC design layout diagram 86. The mask 92 can be formed in various technologies. In some embodiments, the mask 92 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region, and transmits through the transparent regions. In one example, a binary mask version of the mask 92 includes a transparent substrate (e.g., fused quartz) and an opaque material (e.g., chromium) coated in the opaque regions of the binary mask. In another example, the mask 92 is formed using a phase shift technology. In a phase shift mask (PSM) version of the mask 92, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 90 is used in a variety of processes. For example, such a mask(s) is used in an ion implantation process to form various doped regions in the semiconductor wafer 94, in an etching process to form various etching regions in the semiconductor wafer 94, and/or in other suitable processes.

The IC fab 84 includes wafer fabrication 96. The IC fab 84 is an IC fabrication business that includes one or more manufacturing facilities for the fabrication of a variety of different IC products. In some embodiments, the IC Fab 84 is a semiconductor foundry. For example, there may be a manufacturing facility for the front end fabrication of a plurality of IC products (FEOL fabrication), while a second manufacturing facility may provide the back end fabrication for the interconnection and packaging of the IC products (BEOL fabrication), and a third manufacturing facility may provide other services for the foundry business.

The IC fab 84 uses the mask(s) 92 fabricated by the mask house 82 to fabricate the semiconductor structures or ICs 98 of the current disclosure. Thus, the IC fab 84 at least indirectly uses the IC design layout diagram 86 to fabricate the semiconductor structures or ICs 98 of the current disclosure. In some embodiments, the semiconductor wafer 94 is fabricated by the IC fab 84 using the mask(s) 92 to form the semiconductor structures or ICs 98 of the current disclosure. In some embodiments, the IC fabrication includes performing one or more lithographic exposures based at least indirectly on the IC design layout diagram 86. The semiconductor wafer 94 includes a silicon substrate or other proper substrate having material layers formed thereon. The semiconductor wafer 94 further includes one or more of various doped regions, dielectric features, multilevel interconnects, and the like (formed at subsequent manufacturing steps).

Figure 6:
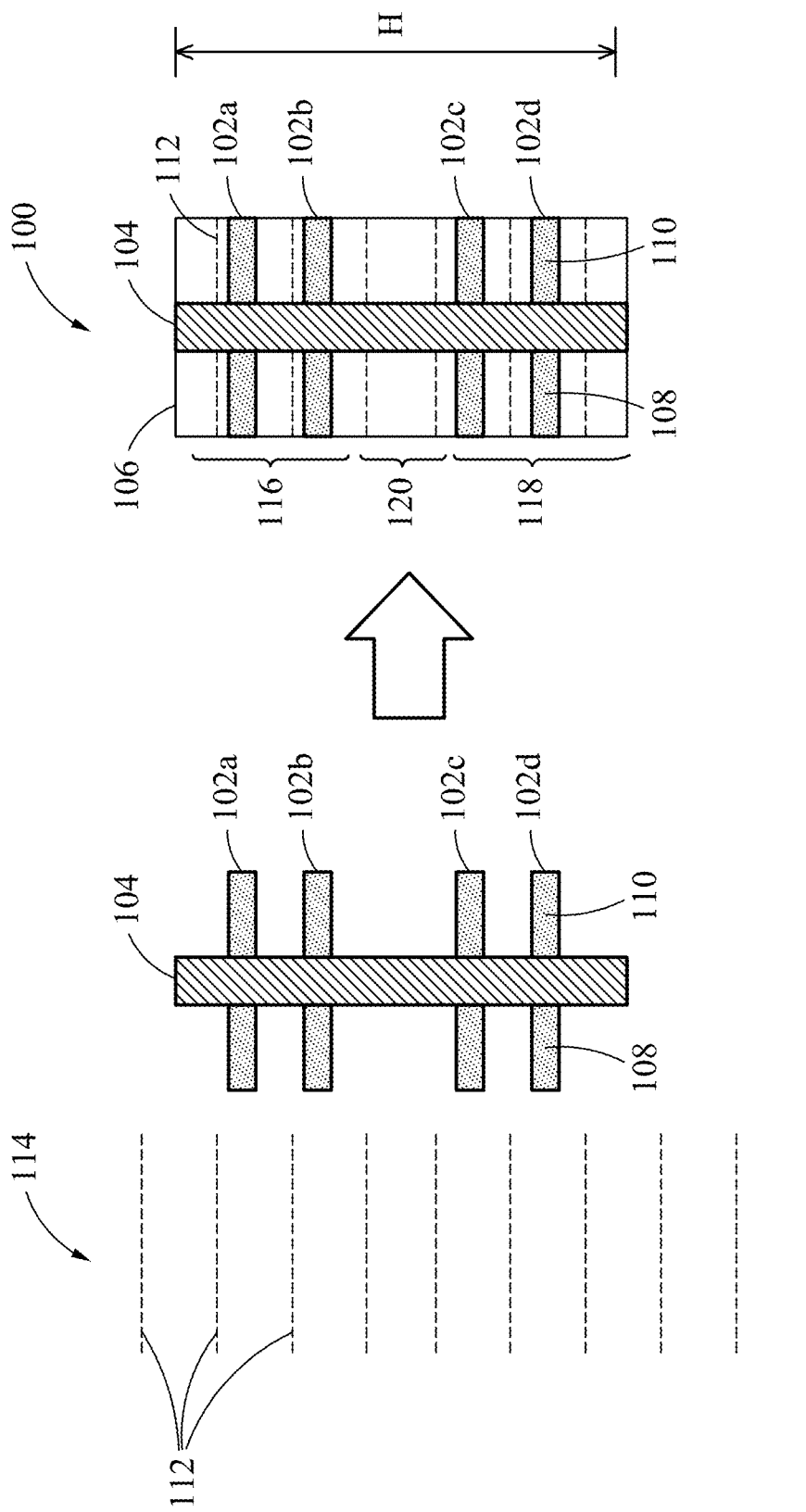
FIG. 6 is a diagram schematically illustrating a fin field-effect transistor (finfet) cell designed with the digital circuit design rules and the digital fin boundary instead of the analog fin boundary, in accordance with some embodiments.

FIG. 6 is a diagram schematically illustrating a finfet cell 100 designed with the digital circuit design rules and the digital fin boundary instead of the analog circuit design rules and the analog fin boundary, in accordance with some embodiments. The finfet cell 100 includes four fins 102a-102d and a gate 104 situated within a cell boundary 106. Each of the four fins 102a-102d includes a source region 108 on one side of the gate 104, such as the left side, and a drain region 110 on the other side of the gate 104, such as the right side. In other embodiments, the source region 108 can be on the right side of the gate 104 and the drain region 110 can be on the left side of the gate 104. Also, in other embodiments, the finfet cell 100 can include fewer than four fins 102a-102d or more than four fins 102a-102d.

In an IC designed using the analog circuit design rules and the analog fin boundary, the fins of the finfet cell are separated by an equal distance, i.e., the fin pitch. The fins are situated on equally spaced grid lines 112 of an equal fin grid 114 that is associated with the analog circuit design rules and the analog fin boundary. Each of the fins of the finfet cell aligns with one of the grid lines 112 of the equal fin grid 114. For example, with four fins, one fin is situated on each of four adjacent grid lines 112.

The fins 102a-102d of the finfet cell 100, designed using digital circuit design rules and the digital fin boundary, do not align with and are not situated on the grid lines 112 of the equal fin grid 114. Instead, the fins 102a-102d are situated between or interleaved with the grid lines 112 of the equal fin grid 114. Also, the finfet cell 100 has the same fin formation or boundary as that of a digital logic cell designed using the digital fin boundary. The finfet cell 100 has two fins 102a and 102b on a top portion 116 of the finfet cell 100 and two fins 102c and 102d on a bottom portion 118 of the finfet cell 100. Between the top portion 116 and the bottom portion 118 is a middle portion 120 that does not have any fins, which allows for routing metal lines through the finfet cell 100 or to the gate 104 of the finfet cell 100.

In embodiments, with the fins 102a-102d situated between the grid lines 112 and with the finfet cell 100 having a middle portion 120 that does not have any fins, the efficiency of space usage in and through the finfet cell 100 can be increased, such that the device size can be made smaller. Also, in embodiments, with the fins 102a-102d situated between the grid lines 112, the height H of the finfet cell 100 can be reduced or decreased in relation to a finfet cell designed using analog circuit design rules and the analog fin boundary, such that the device size can be made smaller.

Figure 7:
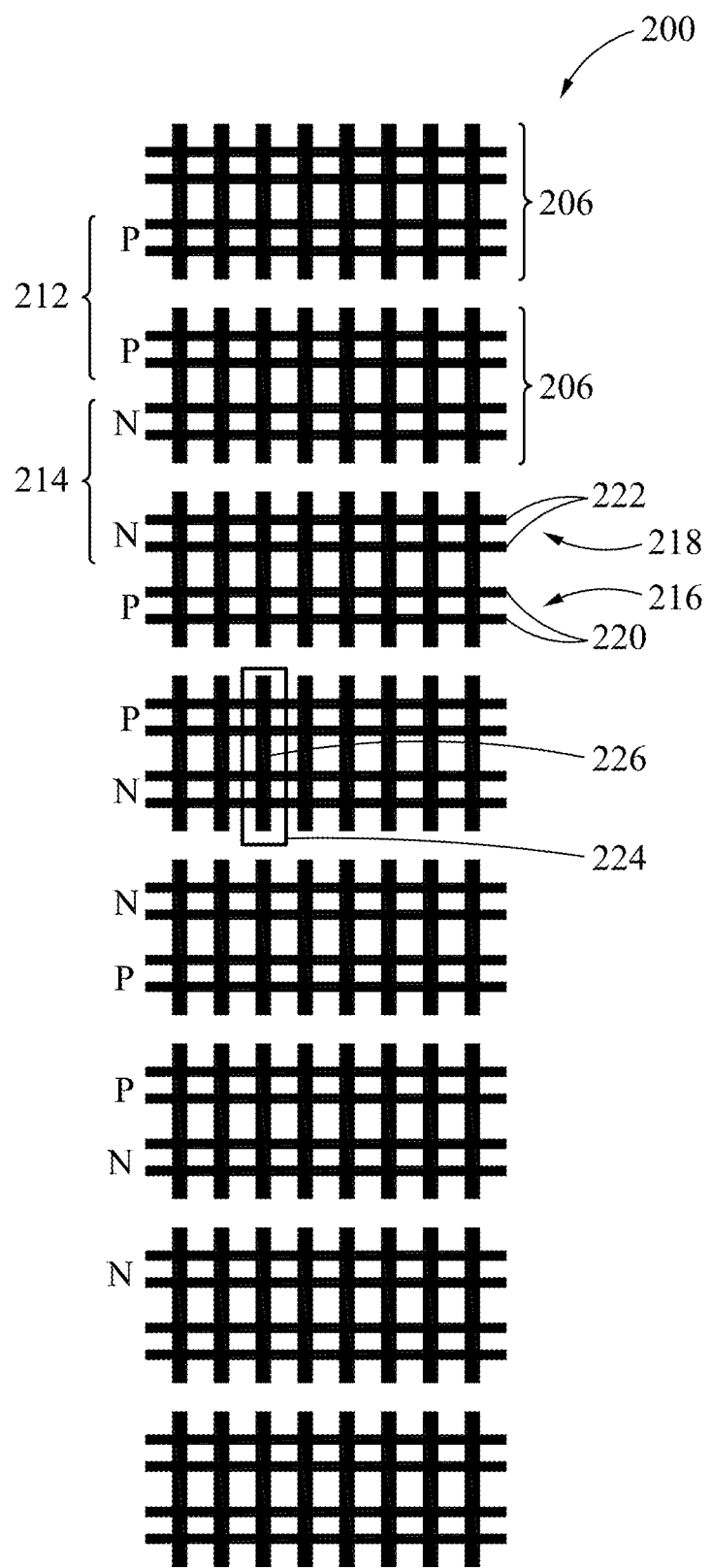
FIG. 7 is a diagram schematically illustrating an analog cell device type that includes finfet cells designed with the digital fin boundary and arranged to have two rows of PMOS finfet transistors followed by two rows of NMOS finfet transistors, in a repeating pattern, in accordance with some embodiments.
Figure 8:
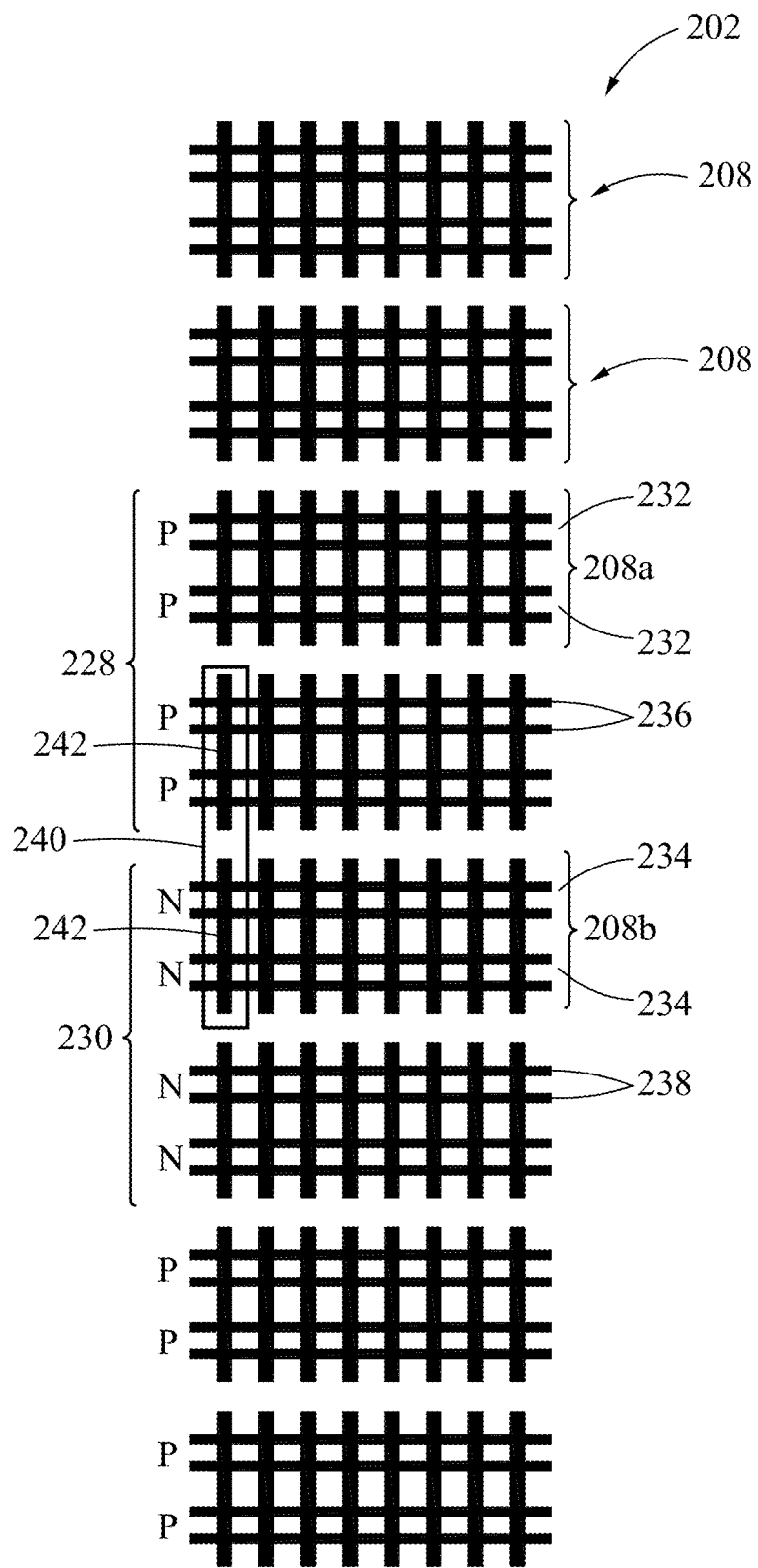
FIG. 8 is a diagram schematically illustrating another analog cell device type that includes finfet cells designed with the digital fin boundary, in accordance with some embodiments.
Figure 9:
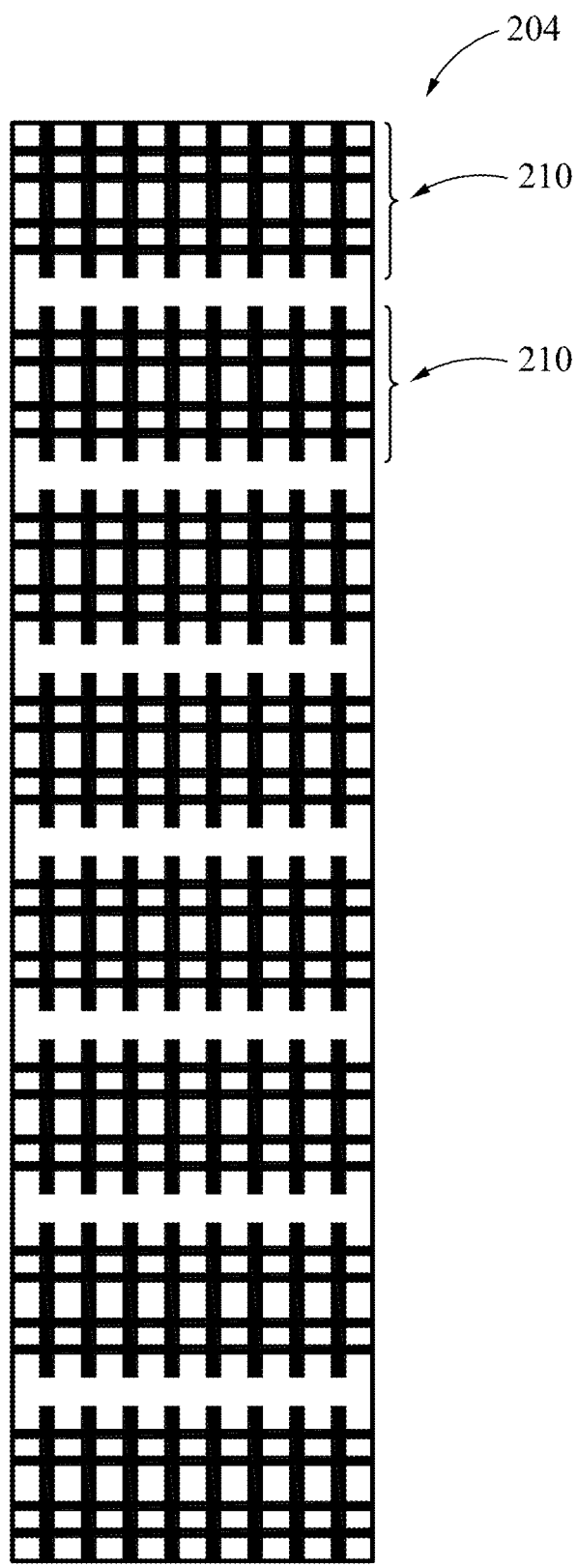
FIG. 9 is a diagram schematically illustrating an analog cell device type that includes finfet cells designed with the digital fin boundary and arranged in a column and having all the same kind of finfets, in accordance with some embodiments.

FIGS. 7-9 are diagrams schematically illustrating different analog cell device types 200, 202, and 204, in accordance with some embodiments. The analog cell device types 200, 202 and 204 include finfet cells 206, 208, and 210, respectively, designed using the digital circuit design rules and the digital fin boundary. In embodiments, the analog cell device types can be used in at least analog circuits, a mixture of analog and digital circuits, and/or a serdes circuit. In embodiments, the finfet cells 206, 208, and 210 are like the finfet cell 100 shown in FIG. 6.

FIG. 7 is a diagram schematically illustrating the analog cell device type 200 that includes finfet cells 206 designed using the digital circuit design rules and the digital fin boundary arranged in a column to have two rows of PMOS finfets 212, followed by two rows of NMOS finfets 214, followed by two rows of PMOS finfets 212, followed by two rows of NMOS finfets 214, and so on, in a repeating pattern, in accordance with some embodiments. In embodiments, the analog cell device type 200 includes finfet cells 206 arranged in extended rows (not shown).

Each of the finfet cells 206 includes a row of PMOS finfets 216 and a row of NMOS finfets 218. The row of PMOS finfets 216 includes two fins 220 and the row of NMOS finfets 214 includes two fins 222. In embodiments, each of the finfet cells 206 includes multiple pairs of finfets 224, with each pair of finfets 224 including one PMOS finfet 216 and one NMOS finfet 218. In embodiments, each pair of finfets 224 share the same gate 226.

The analog cell device type 200 has the finfet cells 206 arranged such that the row of PMOS finfets 216 in one finfet cell 206 is adjacent the row of PMOS finfets 216 in an adjacent finfet cell 206, and the row of NMOS finfets 218 in one finfet cell 206 is adjacent the row of NMOS finfets 218 in an adjacent finfet cell 206. This results in two rows of PMOS finfets 212 being adjacent one another followed by two rows of NMOS finfets 214 being adjacent one another in the repeating pattern. In embodiments, this arrangement of NMOS finfets and PMOS finfets is the same as the arrangement of NMOS finfets and PMOS finfets in logic circuit devices, such as standard cell devices.

FIG. 8 is a diagram schematically illustrating the analog cell device type 202 that includes finfet cells 208 designed using the digital circuit design rules and the digital fin boundary, in accordance with some embodiments. The analog cell device type 202 is designed to have four rows of PMOS finfets 228, followed by four rows of NMOS finfets 230, followed by four rows of PMOS finfets 228, followed by four rows of NMOS finfets 230, and so on, in a repeating pattern. The finfet cells 208 in the analog cell device type 202 are arranged in a column. Of course, in embodiments, the analog cell device type 202 can include finfet cells 208 arranged in extended rows (not shown).

The finfet cells 208 come in two varieties. One is a PMOS finfet cell 208a that includes two rows of PMOS finfets 232, and the other is an NMOS finfet cell 208b that includes two rows of NMOS finfets 234. Each row of PMOS finfets 232 includes two fins 236 and each row of NMOS finfets 234 includes two fins 238.

The finfet cells 208 are arranged in the analog circuit device type 202 to have two PMOS finfet cells 208a followed by two NMOS finfet cells 208b, and so on, in the repeating pattern. In embodiments, the analog cell device type 202 includes double height sets of finfets 240, where each double height set of finfets 240 includes finfets from two rows of PMOS finfets 232 and from two rows of NMOS finfets 234. In embodiments, each double height set of transistors 240 shares the same gate 242. In embodiments, the arrangement of NMOS finfets 234 and PMOS finfets 232 in the analog cell device type 202 is different than the arrangement of NMOS finfets and PMOS finfets in logic circuit devices, such as standard cell devices.

FIG. 9 is a diagram schematically illustrating the analog cell device type 204 that includes finfet cells 210 designed using the digital circuit design rules and the digital fin boundary arranged in a column and having all the same kind of finfets, in accordance with some embodiments. In embodiments, the analog cell device type 204 has finfet cells 210 arranged in the column with all rows of the column being PMOS finfets. In embodiments, the analog cell device type 204 has finfet cells 210 arranged in the column with all rows of the column being NMOS finfets. In some embodiments, the analog cell device type 204 includes one column of finfet cells 210 having all rows of PMOS finfets and an adjacent column of finfet cells 210 having all rows of NMOS finfets. In embodiments, this arrangement of finfet cells 210 is different than the arrangement of NMOS finfets and PMOS finfets in logic circuit devices, such as standard cell devices.

Figure 10A:
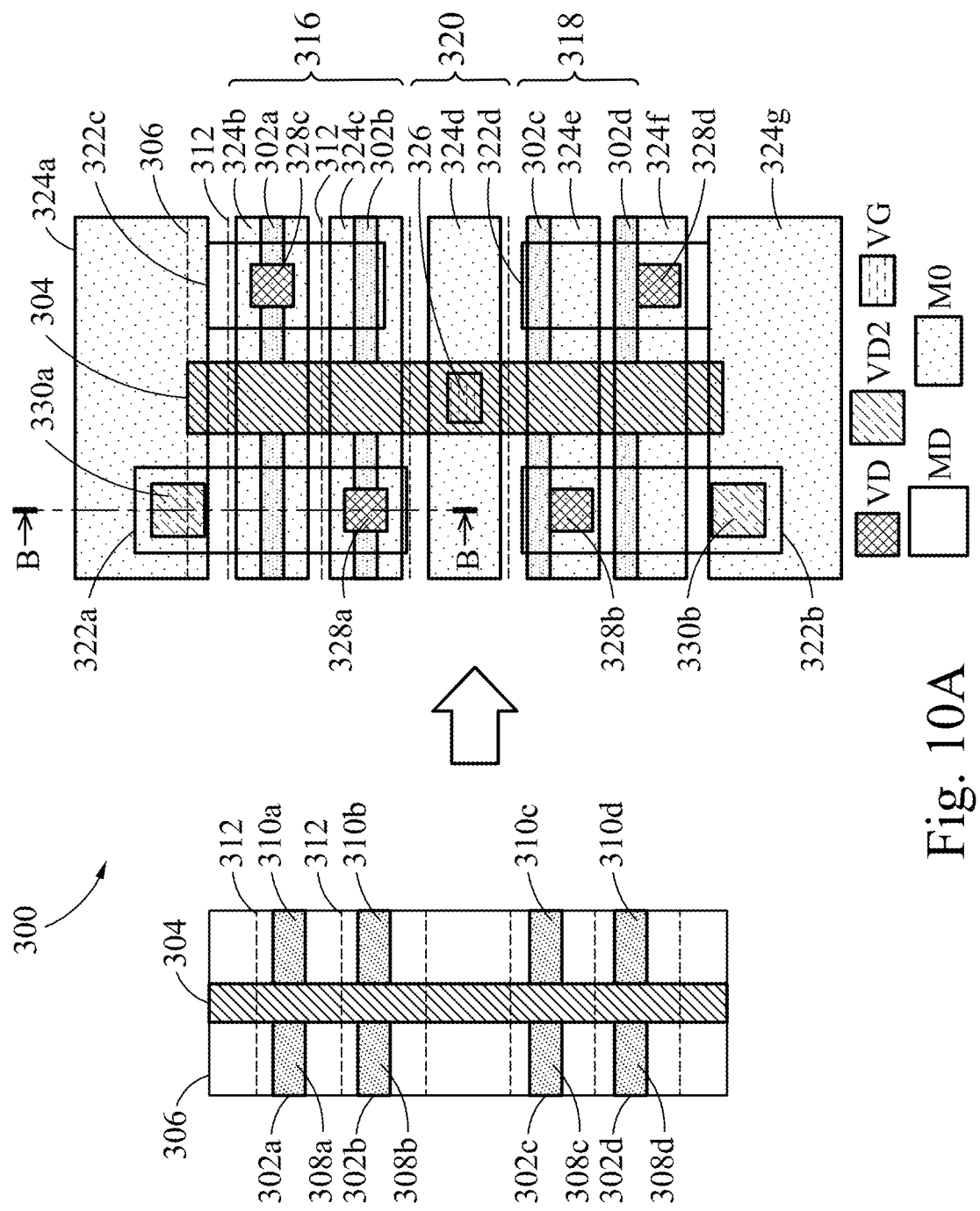
FIG. 10A is a diagram schematically illustrating a finfet cell in the IC having analog cells designed using digital circuit design rules and the digital fin boundary and including middle end of line (MEOL) layers, in accordance with some embodiments.

FIG. 10A is a diagram schematically illustrating a finfet cell 300 in the IC 20 having analog cells designed using digital circuit design rules and the digital fin boundary and including MEOL layers, in accordance with some embodiments. In embodiments, these analog cells can be used in analog circuits, digital circuits, a mixture of analog and digital circuits, and in serdes circuits formerly entirely designed using the analog circuit design rules and the analog fin boundary. In embodiments, the finfet cell 300 is like the finfet cell 100 shown in FIG. 6.

The finfet cell 300 includes four fins 302a-302d and a gate 304 situated within a cell boundary 306. Each of the four fins 302a-302d includes a corresponding source region 308a-308d on one side of the gate 304, such as the left side, and a corresponding drain region 310a-310d on the other side of the gate 304, such as the right side. In other embodiments, the source regions 308a-308d can be on the right side of the gate 304 and the drain regions 310a-310d can be on the left side of the gate 304. Also, in other embodiments, the finfet cell 300 can include fewer than four fins 302a-302d or more than four fins 302a-302d.

The fins 302a-302d of the finfet cell 300, designed using digital circuit design rules and the digital fin boundary, do not align with and are not situated on the grid lines 312. Instead, the fins 302a-302d are situated between the grid lines 312. Also, the finfet cell 300 has the same fin boundary or formation as that of a logic cell designed with the digital fin boundary. The finfet cell 300 has two fins 302a and 302b on a top portion 316 of the finfet cell 300 and two fins 302c and 302d on a bottom portion 318 of the finfet cell 300. Between the top portion 316 and the bottom portion 318 is a middle portion 320 that does not have any fins, which allows for the routing of metal lines through the finfet cell 300 or to the gate 304 of the finfet cell 300.

As illustrated in FIG. 10A, the MEOL layers include MDs 322a-322d, M0 lines 324a-324g, VG 326, VDs 328a-328d, and VD2s 330a and 330b. The gate 304 of finfet cell 300 is electrically coupled to M0 324d by VG 326. The source regions 308a and 308b are electrically coupled to MD 322a and the source regions 308c and 308d are electrically coupled to MD 322b. Also, the drain regions 310a and 310b are electrically coupled to MD 322c and the drain regions 310c and 310d are electrically coupled to MD 322d.

The M0 lines 324a and 324g are wider metal lines that are less resistive per unit length than the narrower metal lines of M0 lines 324b-324f. In embodiments, the wider metal lines M0 324a and 324g range in width from 10 nanometers (nm) to 50 nm and the narrower metal lines M0 324b-324f range in width from 6 nm to 20 nm.

On the source side of finfet cell 300, MD 322a is electrically coupled to M0 324c by VD 328a and to M0 324a by VD2 330a, which electrically couples source regions 308a and 308b to M0 324a and M0 324c. The MD 322b is electrically coupled to M0 324e by VD 328b and to M0 324g by VD2 330b, which electrically couples source regions 308c and 308d to M0 324e and M0 324g.

Each of the VD2s 330a and 330b is larger in size than each of the VDs 328a-328d. In some embodiments, VD2 ranges from 8 nm×8 nm to 24 nm×24 nm and VD ranges from 6 nm×6 nm to 20 nm×20 nm. VD2 contacts the wider metal lines 324a and 324g and VD contacts the narrower metal lines 324b, 324c, 324e, and 324f. In embodiments, the VD2 330a and 330b are only allowed when the digital circuit design rules and the digital fin boundary is used to design the cells. Thus, analog circuits designed and manufactured using the digital circuit design rules can include VD2 to contact MD to improve performance, since the resistance of VD2 is at least 50% lower than the resistance of VD.

On the drain side of finfet cell 300, the MD 322c is electrically coupled to M0 324b by VD 328c to electrically couple drain regions 310a and 310b to M0 324b, and the MD 322d is electrically coupled to M0 324f by VD 328d to electrically couple drain regions 310c and 310d to M0 324f.

Figure 10B:
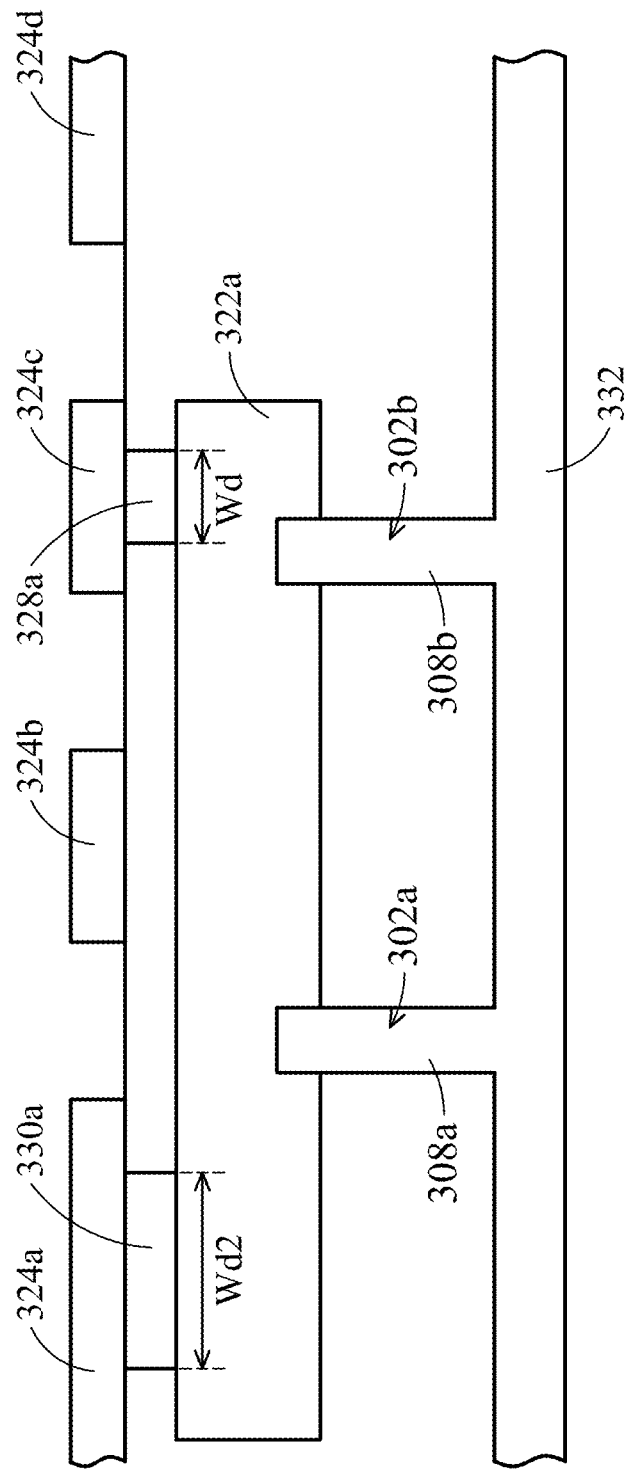
FIG. 10B is a cross-section diagram schematically illustrating a portion of the finfet cell of FIG. 10A along the lines B-B in FIG. 10A, in accordance with some embodiments.

FIG. 10B is a cross-section diagram schematically illustrating a portion of the finfet cell of FIG. 10A along the lines B-B in FIG. 10A, in accordance with some embodiments.

The cross-section of FIG. 10B illustrates the fins 302a and 302b extending from a substrate 332. The source regions 308a and 308b of the fins 302a and 302b, respectively, are electrically coupled to MD 322a.

VD2 330a electrically connects the MD 322a to the wider metal line 324a and VD 328a electrically connects the MD 322a to the narrower metal line 324c. VD2 330a is larger in size than VD 328a. In some embodiments, VD2 is square and, in some embodiments, VD is square. Also, in some embodiments, VD2 has a width Wd2 that ranges from 8 nm to 24 nm and, in some embodiments, VD has a width Wd that ranges from 6 nm to 20 nm.

Figure 11:
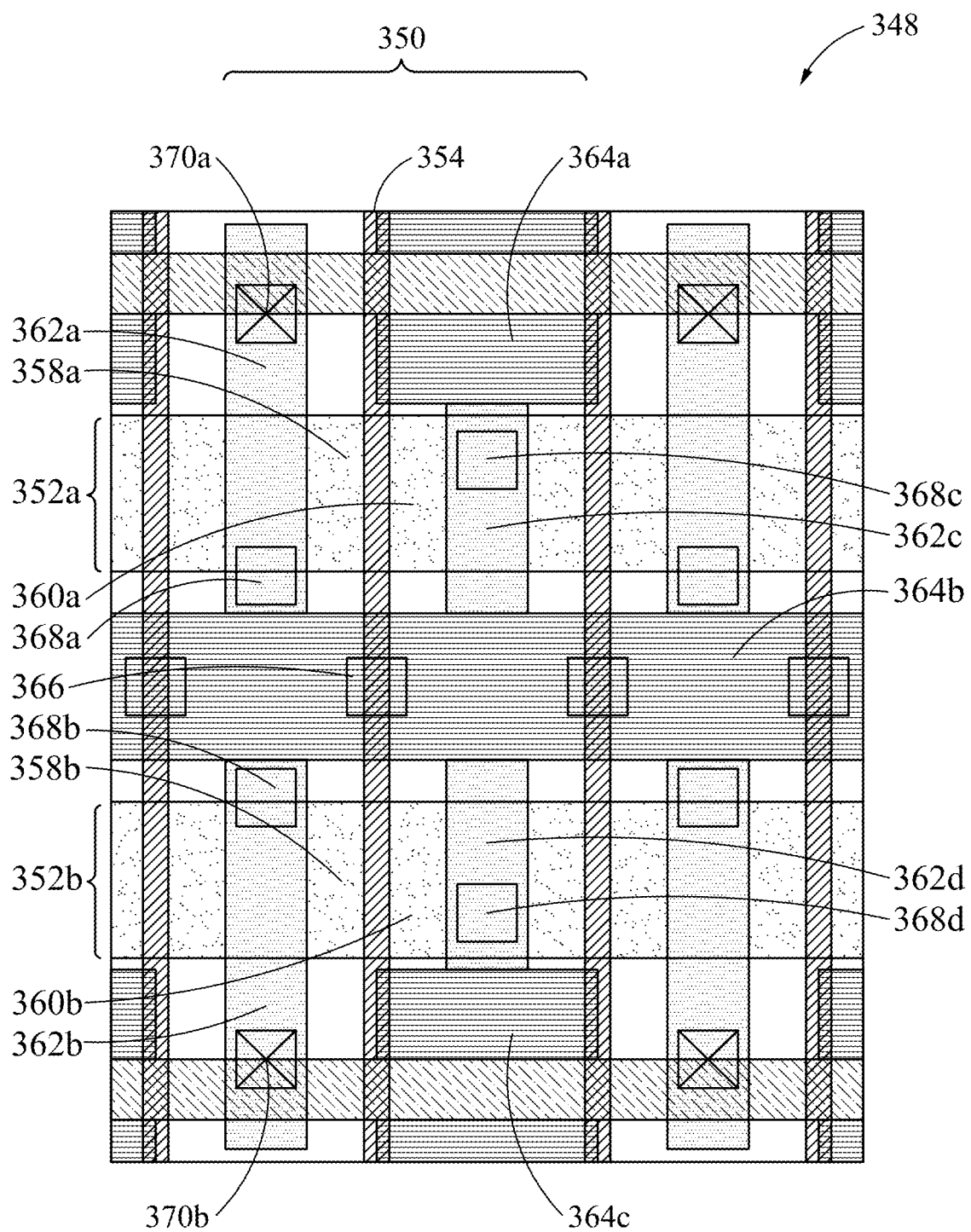
FIG. 11 is a diagram schematically illustrating multiple finfet cells in the IC having analog cells designed using digital circuit design rules and the digital fin boundary and including MEOL layers, in accordance with some embodiments.

FIG. 11 is a diagram schematically illustrating finfet cells 348 in the IC 20 having analog cells designed using the digital circuit design rules and the digital fin boundary and including at least some of the MEOL layers, in accordance with some embodiments. In embodiments, these analog cells can be used in analog circuits, digital circuits, a mixture of analog and digital circuits, and in serdes circuits formerly entirely designed using the analog circuit design rules and the analog fin boundary.

In FIG. 11, four finfet cells 348 are at least partially shown. However, for clarity, only finfet cell 350 will be described in detail below. Of course, in embodiments, each of the other finfet cells 348 is like the finfet cell 350. Also, in embodiments, each of the finfet cells 348 is like the finfet cell 300 shown in FIG. 10A.

Finfet cell 350 includes four fins 352, two fins at 352a and two fins at 352b, and a gate 354. Also, each of the fins at 352a includes a corresponding source region at 358a on one side of the gate 354 and a corresponding drain region at 360a on the other side of the gate 354, and each of the fins at 352b includes a corresponding source region at 358b on one side of the gate 354 and a corresponding drain region at 360b on the other side of the gate 354. In other embodiments, the source and drain regions 358 and 360 can be switched to the other sides of the gate 354.

As illustrated in FIG. 11, the MEOL layers include MDs 362a-362d, cut MD regions (CMDs) 364a-364c, VG 366, VDs 368a-368d, and VD2s 370a and 370b. The gate 354 of finfet cell 350 is electrically coupled to VG 366. The source regions at 358a are electrically coupled to MD 362a and the source regions at 358b are electrically coupled to MD 362b. The drain regions at 360a are electrically coupled to MD 362c and the drain regions at 360b are electrically coupled to MD 362d.

On the source side of the finfet cell 350, MD 362a is electrically coupled to VD 368a and to VD2 370a, and the MD 362b is electrically coupled to VD 368b and to VD2 370b. Each of the VD2s 370a and 370b is larger in size than each of the VDs 368a-368d. In some embodiments, VD2 ranges from 8 nm×8 nm to 24 nm×24 nm and VD ranges from 6 nm×6 nm to 20 nm×20 nm. In some embodiments, the VD2s 370a and 370b are only allowed using the digital circuit design rules. Thus, analog circuits designed and manufactured using the digital circuit design rules can include VD2 to contact MD to improve performance, since the resistance of VD2 is at least 50% lower than the resistance of VD.

On the drain side of the finfet cell 350, the MD 362c is electrically coupled to VD 368c, and the MD 362d is electrically coupled to VD 368d.

In finfet cell 350, the MDs 362a and 362b are separated by CMD 364c, and the MDs 362c and 362d are separated by CMD 364b. Also, each of the MDs 362c and 362d have been further shortened by CMDs 364a and 364c, respectively, which further shortens the MDs 362c and 362d. Making the MDs 362a-362d shorter, decreases the capacitance C from the MDs 362a-362d to the polysilicon of the gate 354.

Thus, using the digital circuit design rules to design the analog circuits increases the GM, where VD2 increases GM by reducing the resistance in the MEOL, and decreases the capacitance C from the MDs to the polysilicon of the gate 354. This also increases UGF, where UGF=GM/C. In addition, using the digital circuit design rules to design the analog cells provides a process anchor point for ultra-low voltage threshold (ULVT) circuits.

Figure 12:
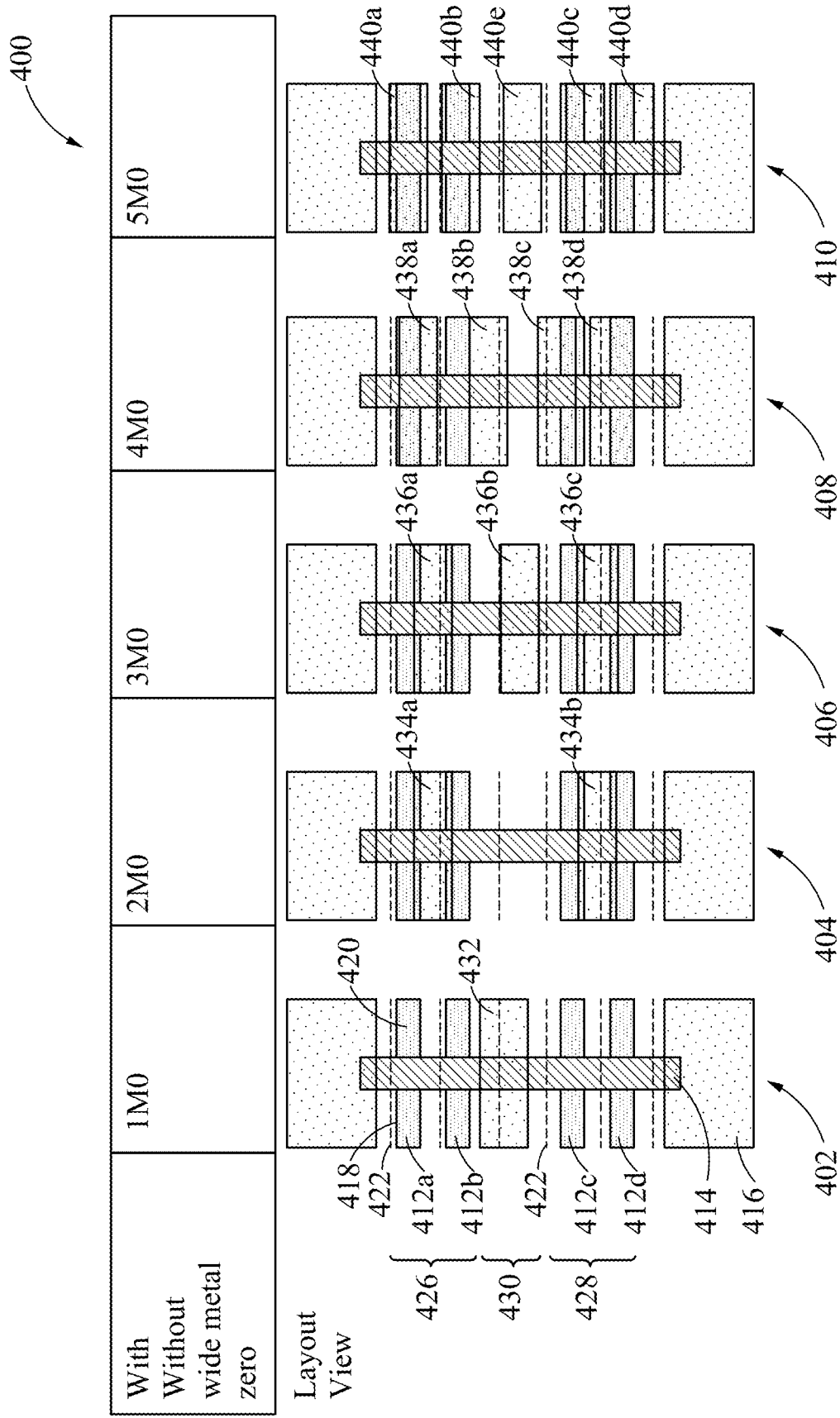
FIG. 12 is a table schematically illustrating M0 lines or tracks in analog cells designed using digital circuit design rules and the digital fin boundary, in accordance with some embodiments.

FIG. 12 is a table 400 schematically illustrating M0 lines or tracks in analog cells 402, 404, 406, 408, and 410 designed using digital circuit design rules and the digital fin boundary, in accordance with some embodiments. In some embodiments, each of the analog cells 402, 404, 406, 408, and 410 is like finfet cell 100 shown in FIG. 6.

Each of the analog cells 402, 404, 406, 408, and 410 includes four fins 412a-412d and a gate 414 situated within a cell boundary 416. Each of the four fins 412a-412d includes a source region 418 on one side of the gate 414 and a drain region 420 on the other side of the gate 414. The fins 412a-412d of the analog circuit cells 402, 404, 406, 408, and 410 do not align with and are not situated on the grid lines 422 of an equal fin grid. Instead, the fins 412a-412d are situated between the grid lines 422. Also, each of the analog circuit cells 402, 404, 406, 408, and 410 has the same fin formation or boundary as that of a logic cell, two fins 412a and 412b on a top portion 426 and two fins 412c and 412d on a bottom portion 428. Between the top portion 426 and the bottom portion 428 is a middle portion 430 that does not have any fins, which allows for the routing of metal lines.

In analog cells designed using analog circuit design rules and an analog fin boundary, the M0 tracks are aligned with the fins and, basically, with the grid lines 422 of the equal fin grid. This is different than the arrangement of M0 lines or tracks in analog cells, such as analog circuit cells 402, 404, 406, 408, and 410, designed using the digital circuit design rules and the digital fin boundary. In these analog circuit cells 402, 404, 406, 408, and 410, the number of M0 tracks is optional. For example, the number of M0 tracks can range from 1 to 5 or even more M0 tracks in each of the analog cells 402, 404, 406, 408, and 410.

The table 400 includes the layouts of analog cells 402, 404, 406, 408, and 410 including one M0 track 432, two M0 tracks 434a and 434b, three M0 tracks 436a-436c, four M0 tracks 438a-438d, and 5 M0 tracks 440a-440e, respectively. These M0 track counts do not include the wide M0 tracks 442 and 444 at the top and bottom of each of the analog circuit cells 402, 404, 406, 408, and 410.

As shown in FIG. 12, analog cell 402 includes one M0 track 432 situated between the fins 412b and 412c and on one of the grid lines 422. Analog cell 404 includes two M0 tracks 434a and 434b, one M0 track 434a situated near fins 412a and 412b and on a grid line 422 and the other M0 track 434b situated near fins 412c and 412d and on a grid line 422. Analog cell 406 includes three M0 tracks 436a-436c, with one M0 track 436b situated between the fins 412b and 412c and on or near a grid line 422, another M0 track 436a situated near fins 412a and 412b and on a grid line 422, and the other M0 track 436c situated near fins 412c and 412d and on a grid line 422. Analog cell 408 includes four M0 tracks 438a-438d, with one M0 track 438a-438d situated near each of the fins 412a-412d and on or near grid lines 422. Analog cell 410 includes five M0 tracks 440a-440e, with one M0 track 440a-440d situated near each of the fins 412a-412d and one M0 track 440e situated between fins 412b and 412c.

In other embodiments, the analog cells 402, 404, 406, 408, and 410 can have more than five M0 lines or tracks.

FIG. 13 is a table 500 illustrating threshold voltage (Vt) levels that can be achieved in analog and digital cells designed using the digital circuit design rules and the digital fin boundary versus Vt levels that can be achieved in analog cells designed using the analog circuit design rules and the analog fin boundary, in accordance with some embodiments. The Vt levels include: standard Vt (SVT) at 502, which has the lowest leakage levels; low Vt with low leakage (LVTLL) at 504; low Vt (LVT) at 506; ultra low Vt with low leakage (ULVTLL) at 508; ultra low Vt (ULVT) at 510; and extreme low VT (ELVT) at 512. SVT at 502 has the highest Vt, followed by, in decreasing Vt order, LVTLL at 504, LVT at 506, ULVTLL at 508, ULVT at 510, and ELVT at 512 with the lowest Vt.

As shown in table 500, analog cells designed with the digital fin boundary at 514 and digital circuits designed with the digital fin boundary at 516 can be designed and manufactured with any of the threshold voltages of SVT at 502, LVTLL at 504, LVT at 506, ULVTLL at 508, ULVT at 510, and ELVT at 512. This is different than analog cells designed with the analog fin boundary at 518, where ULVTLL at 508 and ELVT at 512 cannot be built using the analog circuit design rules and the analog fin boundary.

Figure 14:
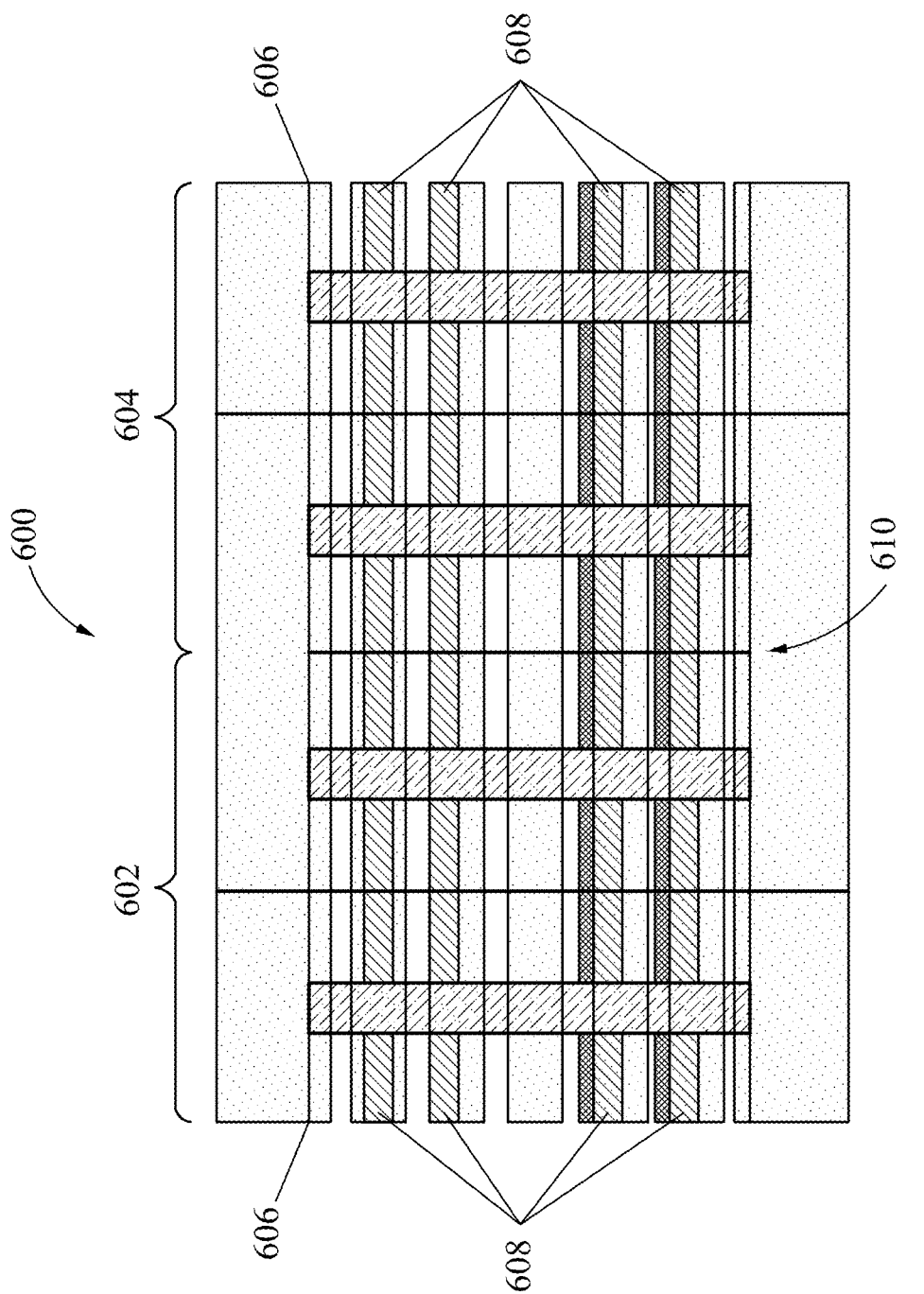
FIG. 14 is a diagram schematically illustrating an IC including analog cells designed using digital circuit design rules and the digital fin boundary situated next to digital cells designed using digital circuit design rules and the digital fin boundary, in accordance with some embodiments.

FIG. 14 is a diagram schematically illustrating an IC 600 including analog cells at 602 designed using the digital circuit design rules and the digital fin boundary and situated next to digital circuit cells 604 designed using digital circuit design rules and the digital fin boundary, in accordance with some embodiments. With the analog circuit cells 602 and the digital circuit cells 604 designed using the same digital circuit design rules and the same digital fin boundary, the cells 602 and 604 have the same cell boundaries 606 and fin formation of four fins 608. Thus, the analog cells 602 can directly abut at 610 the digital cells 604, without an extra keep-out space being provided between the different cells 602 and 604.

Figure 15:
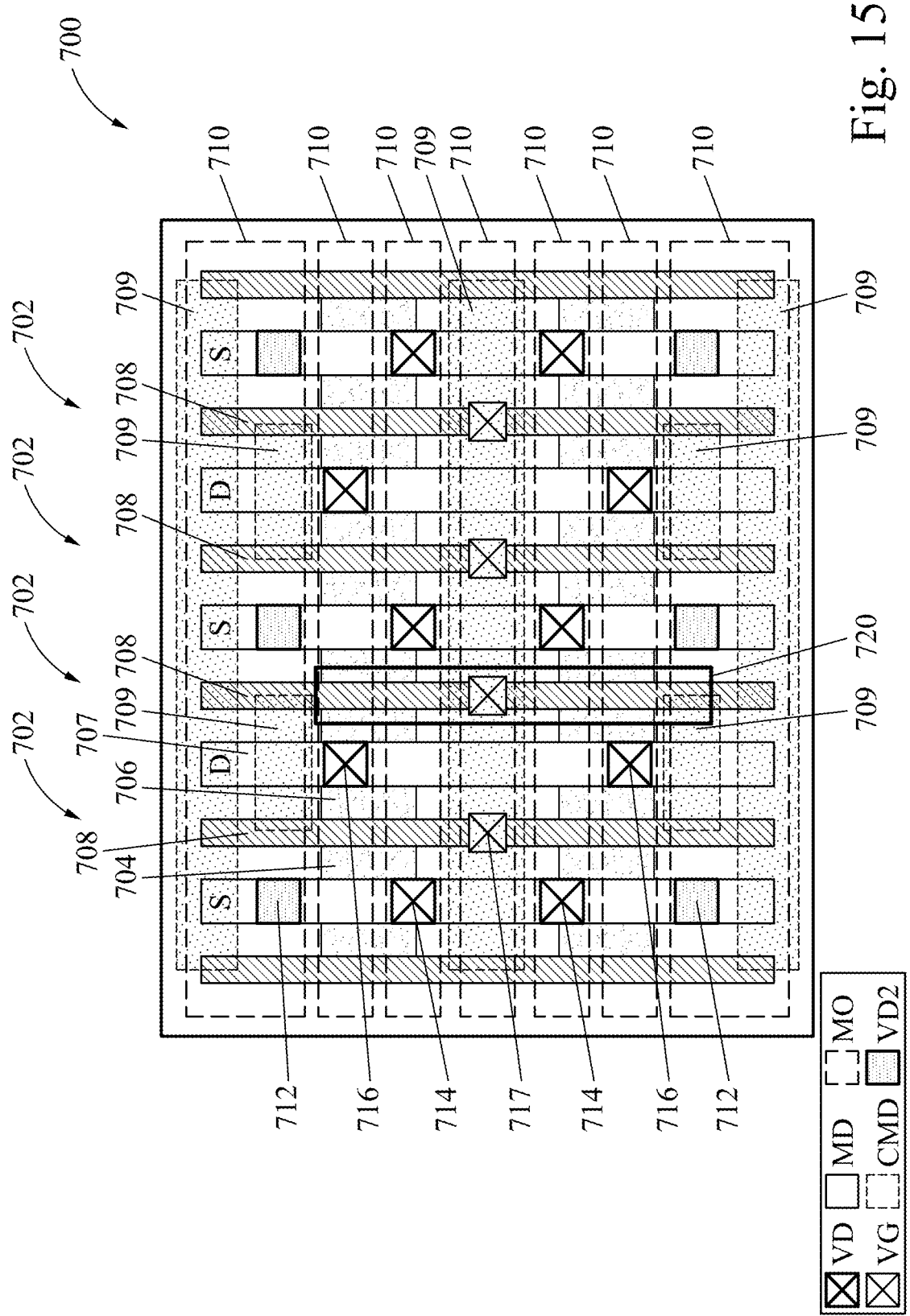
FIG. 15 is a top-view diagram schematically illustrating an example of M0 and below in an IC that includes analog cells designed using digital circuit design rules and the digital fin boundary, in accordance with some embodiments.

FIG. 15 is a top-view diagram schematically illustrating an example of M0 lines and below in an IC 700 that includes analog cells designed using the digital circuit design rules and the digital fin boundary, in accordance with some embodiments. In IC 700, at least some of the metal lines can be made shorter, which increases the maximum allowed EM current through the metal. In embodiments, the IC 700 is like the IC 20 of FIGS. 1 and 2.

The IC 700 includes multiple finfets 702 situated from left to right in FIG. 15. Each of the finfets 702 includes fin source regions 704 electrically coupled to one or more MD indicated at S, fin drain regions 706 electrically coupled to one or more MD indicated at D, and a gate 708 situated between the corresponding source and drain regions 704 and 706. In embodiments, each of the finfets 702 can have MDs cut in CMD regions 709.

In embodiments, in each of the finfets 702, the MD of the source S is connected to M0 710 through one or more VD2 712 and through one or more VD 714. Also, in each of the finfets 702, the MD of the drain D is connected to M0 710 through one or more VD 716. Each of the gates 708 is connected to M0 710 through a VG 717.

As illustrated in FIG. 15, the IC 700 includes a cut M0 region 720, where M0 710 is cut to make shorter lines of M0 710. This cut M0 region 720 is allowed using the digital circuit design rules and the digital fin boundary, as opposed to the analog circuit design rules and the analog fin boundary. With shorter lines of M0 710, the maximum EM current is higher. Also, the cut M0 lines 710 can be situated directly next to VD and/or vias VIA0 (shown in FIG. 16). In some embodiments, the lengths of the cut M0 lines range from 0.5 CPP to 8 CPP, and in some embodiments, M0 pitch ranges from 5 nm to 40 nm.

Figure 16:
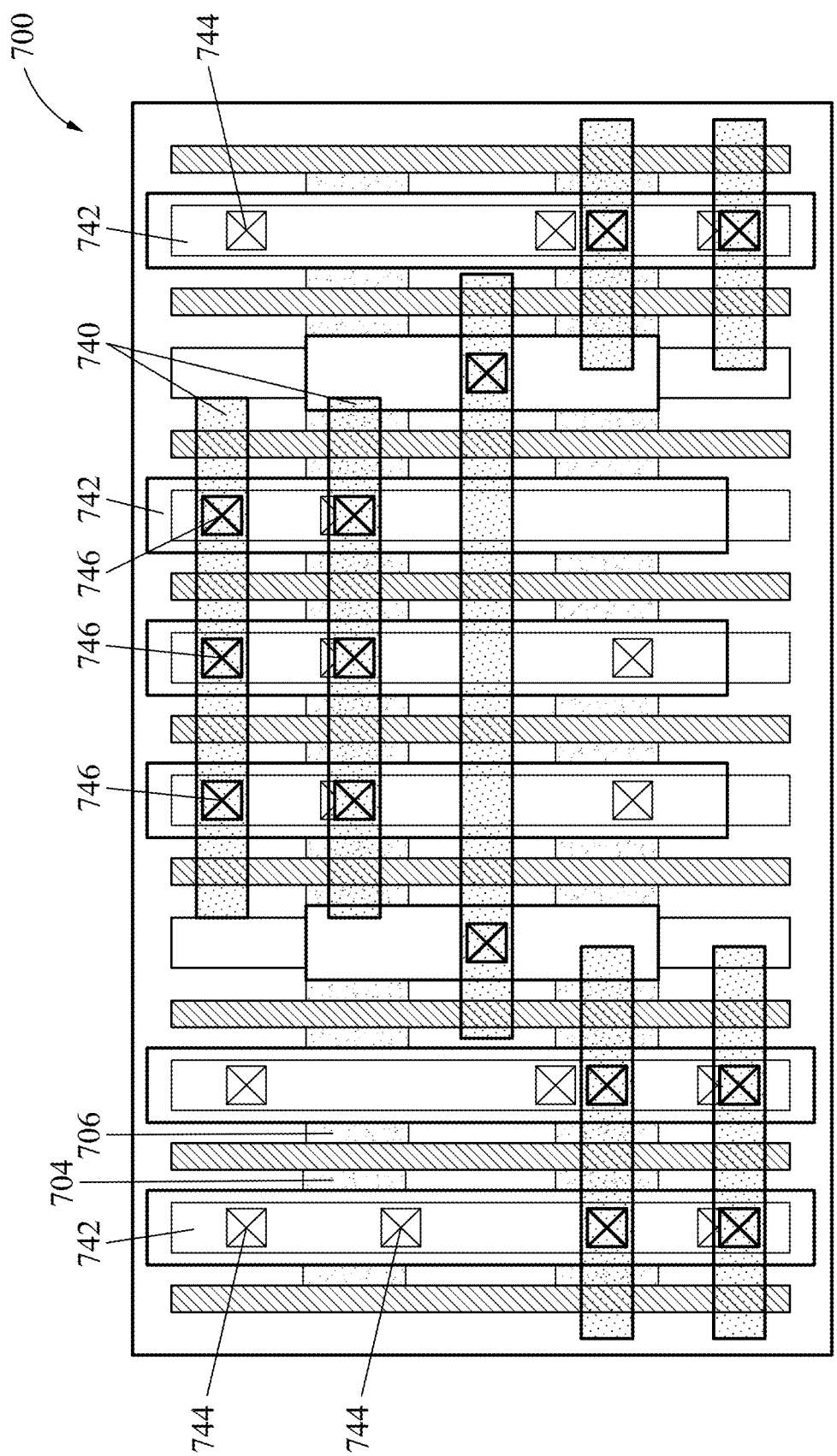
FIG. 16 is a top-view diagram schematically illustrating an example of BEOL layers up to M2 of the IC shown in FIG. 15, in accordance with some embodiments.

FIG. 16 is a top-view diagram schematically illustrating an example of BEOL layers up to M2 740 of the IC 700, in accordance with some embodiments. The IC 700 includes M2 740 disposed in horizontal lines or tracks and M1 742 disposed in vertical lines or tracks.

As shown in FIGS. 12 and 13, M0 710 is disposed in horizontal lines or tracks on the IC 700, such that the vertical lines of M1 742 are orthogonal to the horizontal lines of M0 710 and orthogonal to the horizontal lines of M2 740. The tracks of M1 742 are connected to various tracks of M0 710 through vias 744 (VIA0), and the tracks of M1 742 are connected to the tracks of M2 740 through vias 746 (VIA1). Thus, the BEOL layers up to M2 740 are electrically coupled to the source/drain regions 704 and 706 and, in embodiments, to the gates 708.

As described herein, the finfet cells designed using the digital circuit design rules and the digital fin boundary are shorter than the finfet cells designed using the analog circuit design rules and the analog fin boundary, where the finfet cells designed using the digital fin boundary can be less than 7 CPP. Thus, with shorter cell heights, the length of M1 742 is shorter and the EM maximum current is higher. Also, in embodiments, M1 pitch ranges from 28 nm to 60 nm.

Figure 17:
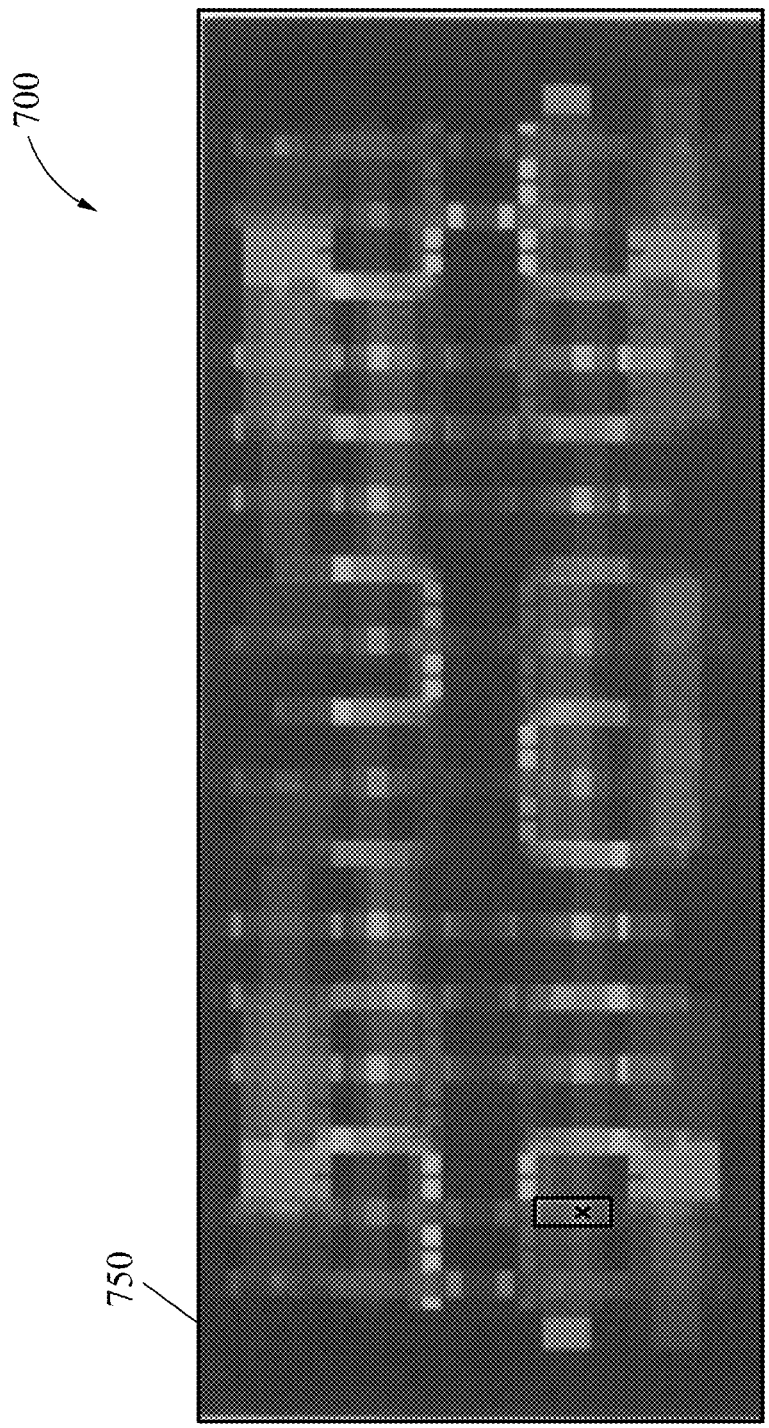
FIG. 17 is a diagram illustrating a temperature profile of the IC of FIGS. 15 and 16, in accordance with some embodiments.

FIG. 17 is a diagram illustrating a temperature profile 750 of the IC 700, in accordance with some embodiments. As shown, the temperature profile 750 is evenly distributed across the IC, from top to bottom and from side to side. Thus, passing the EM analysis in temperature profile.

Figure 18:
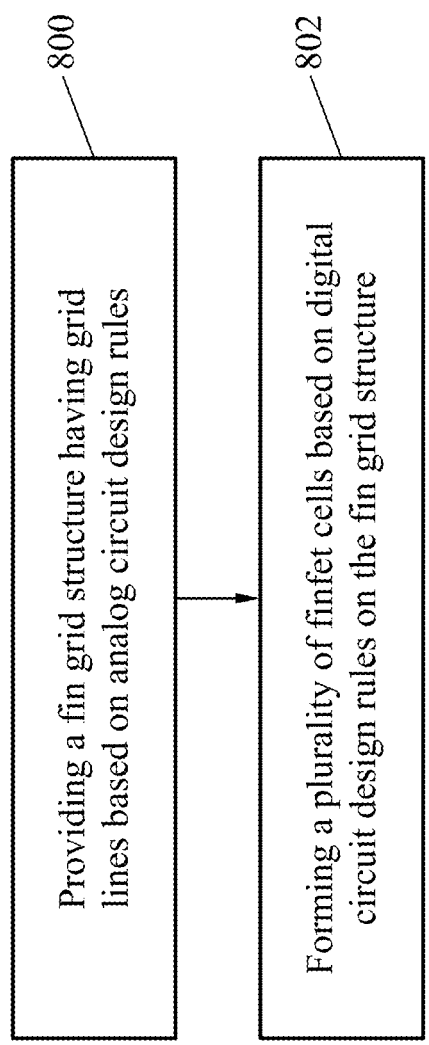
FIG. 18 is a block diagram illustrating a method of manufacturing an IC that includes an analog cell designed using digital circuit design rules and the digital fin boundary, in accordance with some embodiments.

FIG. 18 is a diagram illustrating a method of manufacturing a semiconductor structure, such as an IC, including analog cells designed using digital circuit design rules and the digital fin boundary, in accordance with some embodiments.

At 800, the method includes providing a fin grid structure having grid lines based on the analog circuit design rules and the analog fin boundary. The method continues at 802 with forming a plurality of finfet cells based on digital circuit design rules and the digital fin boundary on the fin grid structure (that is based on the analog circuit design rules and the analog fin boundary). Where, each of the plurality of finfet cells includes fins situated between the grid lines of the fin grid structure, and not on the grid lines.

In some embodiments, the method includes cutting an M0 line in at least one of the plurality of finfet cells to provide a shorter M0 line, which increases the maximum EM current. Also, in some embodiments, the cell height of the finfet cells designed using the digital fin boundary as opposed to the analog fin boundary is shorter, such that at least some of the metal lines are shorter, which increases the maximum EM current.

In some embodiments, the method includes forming MEOL layers in at least one of the plurality of finfet cells in at least one analog circuit structure, wherein forming the MEOL layers includes: forming a first source/drain contact VD having a first resistance, and forming a second source/drain contact VD2 having a second resistance that is less than or equal to 0.5 times the first resistance.

In addition, in some embodiments, the method includes: forming analog cell structures that include at least some of the plurality of finfet cells, forming digital cell structures that include at least some of the plurality of finfet cells, and abutting the analog cell structures next to the digital cell structures.

Disclosed embodiments thus provide semiconductor structures, such as ICs, that include analog cells designed and manufactured using digital circuit design rules and the digital fin boundary. The integrated circuits include finfets, and the designs include fin formation based on the digital circuit design rules and the digital fin boundary, beneficial MEOL layers, optional M0 tracks, a variety of threshold voltages Vt, and features such as direct abutment of analog cells with digital logic cells.

The disclosed embodiments include finfet cells having fins that are not situated on grid lines of a fin grid that is associated with analog circuit design rules and the analog fin boundary. Instead, the fins are situated between the grid lines of the fin grid. In these embodiments, the finfet cell height is decreased, such that the device size can be made smaller. Also, the fin formation of fins in these analog cells leaves a space between fins in the middle of the finfet cell, which can be used for routing metal. In these embodiments, space usage in and around the finfet cells can be increased and the device size can be made smaller.

The arrangement of NMOS and PMOS finfets in the analog circuit device types is flexible. In some embodiments, the arrangement of NMOS and PMOS finfets in the analog circuit devices can be made the same as the arrangement of NMOS and PMOS finfets in the logic circuit devices. In other embodiments, the arrangement of the NMOS and PMOS finfets in the analog circuit devices can be made different than the arrangement of the NMOS and PMOS finfets in the logic circuit devices.

Beneficial attributes of the MEOL layers designed using the digital circuit design rules and the digital fin boundary includes a larger contact region VD2 on the MD to improve performance, since the resistance of VD2 is at least 50% lower than the smaller contact region VD on the MD.

In addition, the arrangement and number of M0 lines in the analog cells designed using the digital circuit design rules and the digital fin boundary is optional and the number varies anywhere from 1 to 5 M0 lines or more. Also, the disclosed analog cells designed using the digital circuit design rules and the digital fin boundary can include shorter MD such that the maximum EM current is higher, shorter M0 lines such that the maximum EM current is higher, and shorter M1 lines such that the maximum EM current is higher.

The advantages of designing and manufacturing semiconductor structures, such as integrated circuits, that include analog cells designed and manufactured using the digital circuit design rules and the digital fin boundary includes finfet cells with higher GM, higher UGF, and higher EM. The GM is higher since resistance is lower in the MEOL and BEOL layers. Also, the UGF is higher where UGF=GM/C and with the higher GM and smaller MEOL capacitance C. In addition, the maximum EM current is higher with shorter metal line lengths, where the digital circuit design rules allow M0 to be cut, and a shorter cell height with shorter M1 lines.

In accordance with some disclosed embodiments, an integrated circuit includes a plurality of finfet cells designed with digital circuit design rules to provide smaller finfet cells with decreased cell heights, and analog circuit cell structures including first finfet cells of the plurality of finfet cells and including at least one cut metal layer. Digital circuit cell structures include second finfet cells of the plurality of finfet cells, and the analog circuit cell structures directly abut the digital circuit cell structures. The smaller finfet cells with decreased cell heights provide a first shorter metal track in one direction and the at least one cut metal layer provides a second shorter metal track in another direction to increase maximum electromigration currents in the integrated circuit.

In accordance with further embodiments, a semiconductor structure includes a plurality of finfet cells. A plurality of source/drain conductors are disposed on and electrically coupled to the plurality of finfet cells, the plurality of source/drain conductors including wider source/drain conductors and thinner source/drain conductors. A plurality of gate conductors are disposed on and electrically coupled to the plurality of finfet cells and are interleaved with the plurality of source/drain conductors. A plurality of gate contacts are electrically coupled between finfet gates in the plurality of finfet cells and the plurality of gate conductors. A plurality of source/drain contacts are electrically coupled between finfet source/drain regions in the plurality of finfet cells and the plurality of source/drain conductors. The plurality of source/drain contacts include first source/drain contacts each having a first width and electrically coupled to at least one of the wider source/drain conductors and second source/drain contacts each having a second width and electrically coupled to at least one of the thinner source/drain conductors, wherein the first width is greater than the second width.

In accordance with still further embodiments, a method includes: providing a fin grid structure having grid lines with a uniform pitch and based on an analog fin boundary; providing a plurality of finfet cells based on a digital fin boundary on the fin grid structure, each of the plurality of finfet cells includes fins interleaved with the grid lines of the fin grid structure; and providing middle end of line (MEOL) layers in at least one of the plurality of finfet cells, wherein providing the MEOL layers includes: providing a first source/drain contact having a first width; and providing a second source/drain contact having a second width that is wider than the first width.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
  a first plurality of finfets, each finfet of the first plurality of finfets having a first finfet height and at least three fins with adjacent fins of the at least three fins separated by a first distance;
  a second plurality of finfets, each finfet of the second plurality of finfets having a second finfet height that is less than the first finfet height and having a first set of two fins separated from each other by a second distance and a second set of two fins separated from each other by the second distance, wherein the first set of two fins is separated from the second set of two fins by a third distance that is greater than the second distance;
  a first metal track situated between the first set of two fins and the second set of two fins without being over any part of a fin of the first set of two fins and the second set of two fins;

a second metal track situated over at least part of each of the two fins in the first set of two fins;

a third metal track situated over at least part of each of the two fins in the second set of two fins;

analog circuits that include first finfets of the second plurality of finfets; and digital circuits that include second finfets of the second plurality of finfets, wherein the first finfets of the second plurality of finfets directly abut the second finfets of the second plurality of finfets, and wherein the analog circuits and the digital circuits include a fourth metal track in one direction and a fifth metal track in another direction, wherein the fifth metal track includes a first track segment of the fifth metal track not electrically connected to a second track segment of the fifth metal track to increase maximum electromigration currents in the integrated circuit.

2. The integrated circuit of claim 1, wherein the second plurality of finfets are arranged to form rows of NMOS finfets and rows of PMOS finfets in a first pattern for the analog circuits and in a second pattern for the digital circuits, wherein the first pattern is the same as the second pattern.

3. The integrated circuit of claim 1, wherein the second plurality of finfets are arranged to form rows of NMOS finfets and rows of PMOS finfets in a first pattern for the analog circuits and in a second pattern for the digital circuits, wherein the first pattern is different than the second pattern.

4. The integrated circuit of claim 1, wherein the second plurality of finfets are connected to one another and to metal layers using middle end of line (MEOL) layers.

5. The integrated circuit of claim 4, wherein the MEOL layers include a plurality of source/drain contacts, wherein the plurality of source/drain contacts include a first source/drain contact having a first resistance and a second source/drain contact having a second resistance that is less than or equal to 0.5 times the first resistance of the first source/drain contact.

6. The integrated circuit of claim 1, wherein each finfet of the second plurality of finfets is configured to include up to 5 first metal layer tracks.

7. The integrated circuit of claim 1, wherein the analog circuits include ultra low threshold voltages with low leakage and extreme low threshold voltages.

8. The integrated circuit of claim 1, wherein the first distance is less than the third distance.

9. The integrated circuit of claim 1, wherein the fifth metal track is a first metal layer track and the fourth metal track is a second metal layer track.

10. The integrated circuit of claim 1, comprising a serializer/deserializer (serdes) circuit that includes finfets of the second plurality of finfet cells.

11. An integrated circuit, comprising:
a plurality of finfets, each finfet of the plurality of finfets having a first set of two fins separated from each other by a first distance and a second set of two fins separated from each other by the first distance, wherein the first set of two fins is separated from the second set of two fins by a second distance that is greater than the first distance, a first metal track situated between the first set of two fins and the second set of two fins without being over any part of a fin of the first set of two fins and the second set of two fins, a second metal track situated over at least part of each of the two fins in the first set of two fins;

a third metal track situated over at least part of each of the two fins in the second set of two fins;

analog circuits that include first finfets of the plurality of finfets and a fourth metal track that includes a first segment of the fourth metal track not electrically connected to a second segment of the fourth metal track; and digital circuits that include second finfets of the plurality of finfets.

12. The integrated circuit of claim 11, wherein the analog circuits directly abut the digital circuits.

13. The integrated circuit of claim 11, wherein the fourth metal track is in one direction and each finfet of the plurality of finfets includes a fifth metal track in another direction with one of the first segment and the second segment electrically connected to the fifth metal track to increase maximum electromigration currents in the integrated circuit.

14. The integrated circuit of claim 11, wherein the plurality of finfets are connected to one another and to metal layers using middle end of line (MEOL) layers.

15. The integrated circuit of claim 14, wherein the MEOL layers include a plurality of source/drain contacts, wherein the plurality of source/drain contacts include a first source/drain contact having a first resistance and a second source/drain contact having a second resistance that is less than or equal to 0.5 times the first resistance of the first source/drain contact.

16. An integrated circuit, comprising:
a plurality of finfets, each finfet of the plurality of finfets having a first set of two fins separated from each other by a first distance and a second set of two fins separated from each other by the first distance, wherein the first set of two fins is separated from the second set of two fins by a second distance that is greater than the first distance;

a first metal track situated between the first set of two fins and the second set of two fins without being over any part of a fin of the first set of two fins and the second set of two fins;

a second metal track situated over at least part of each of the two fins in the first set of two fins;

a third metal track situated over at least part of each of the two fins in the second set of two fins;

analog circuits that include first finfets of the plurality of finfets and a fourth metal track that includes a first segment of the fourth metal track not electrically connected to a second segment of the fourth metal track; and digital circuits that include second finfets of the plurality of finfets, wherein the analog circuits directly abut the digital circuits, and the fourth metal track is in one direction and each finfet of the plurality of finfets includes a fifth metal track in another direction with one of the first segment and the second segment electrically connected to the fifth metal track to increase maximum electromigration currents in the integrated circuit.

17. The integrated circuit of claim 16, wherein the plurality of finfets are connected to one another and to metal layers using middle end of line (MEOL) layers.

18. The integrated circuit of claim 17, wherein the MEOL layers include a plurality of source/drain contacts, wherein the plurality of source/drain contacts include a first source/drain contact having a first resistance and a second source/drain contact having a second resistance that is less than or equal to 0.5 times the first resistance of the first source/drain contact.

19. The integrated circuit of claim 16, wherein the analog circuits include ultra low threshold voltages with low leakage and extreme low threshold voltages.

20. The integrated circuit of claim 16, comprising a serializer/deserializer (serdes) circuit that includes finfets of the plurality of finfets.

* * * * *